United States Patent
Lee et al.

(10) Patent No.: US 11,048,329 B1
(45) Date of Patent: Jun. 29, 2021

(54) MID-AIR ULTRASONIC HAPTIC INTERFACE FOR IMMERSIVE COMPUTING ENVIRONMENTS

(71) Applicant: Emerge Now Inc., Los Angeles, CA (US)

(72) Inventors: Sylvester Lee, Marina del Rey, CA (US); Isaac Castro, Marina del Rey, CA (US); Mauricio Teran, Marina del Rey, CA (US); Jamie Hamilton, Marina del Rey, CA (US); Carmen Badea, Marina del Rey, CA (US); Ravi Patel, Redondo Beach, CA (US); Nathan Brummel, Pasadena, CA (US)

(73) Assignee: Emerge Now Inc., Marina del Rey, CA (US)

(*) Notice: Subject to any disclaimer, the term of this patent is extended or adjusted under 35 U.S.C. 154(b) by 100 days.

(21) Appl. No.: 15/662,159

(22) Filed: Jul. 27, 2017

(51) Int. Cl.
*G06F 3/01* (2006.01)
*G10K 11/34* (2006.01)
(Continued)

(52) U.S. Cl.
CPC .............. *G06F 3/016* (2013.01); *G06F 3/011* (2013.01); *G06F 3/017* (2013.01);
(Continued)

(58) Field of Classification Search
CPC ...... G06F 3/016; G06F 3/04815; G06F 3/011; G06F 3/017; G10K 11/341; H04R 1/22
See application file for complete search history.

(56) References Cited

U.S. PATENT DOCUMENTS 3,811,129 A  5/1974  Holst
4,218,921 A  8/1980  Berge et al.
(Continued)

FOREIGN PATENT DOCUMENTS

CA  2902443 A1  9/2014
CA  2909804 A1  11/2014
(Continued)

OTHER PUBLICATIONS

Perry, Tekla S, "Tiny Bubbles and Force Fields: Feeling the Virtual World With Ultrasound", IEEE Spectrum blog, Nov. 1, 2016.
(Continued)

*Primary Examiner* — Jonathan A Boyd
(74) *Attorney, Agent, or Firm* — Jeffrey Schox; Caitlin Ploch

(57) ABSTRACT

The present disclosure concerns an ultrasound system for providing tactile mid-air haptic feedback. As described herein, various embodiments of the invention can create a precise mid-air tactile sensation in mid-air on a body part of a user through use of an array of ultrasonic emitters. The array produces steerable focal points of ultrasonic energy that provide sufficient radiation pressure to be felt by the skin of the user. Such an implementation allows for multiple points of contact with immersive computing environments in a variety of form factors. This implementation, too, allows for coverage of larger distances and provides for a wider range of interactions thereby allowing a user to extend an appendage into a broader workspace while providing for multiple points of or comprehensive sensation or interaction without sacrificing user comfort with respect to any such interaction.

28 Claims, 12 Drawing Sheets

(51) Int. Cl.
 *H04R 1/22* (2006.01)
 *G06F 3/0481* (2013.01)
(52) U.S. Cl.
 CPC ........ *G06F 3/04815* (2013.01); *G10K 11/341* (2013.01); *H04R 1/22* (2013.01)

(56) References Cited

U.S. PATENT DOCUMENTS

| | | | |
|---|---|---|---|
| 5,717,434 A | 2/1998 | Toda | |
| 5,776,065 A | 7/1998 | Mehmanpazir et al. | |
| 6,503,204 B1 | 1/2003 | Sumanaweera et al. | |
| 7,079,450 B2 | 7/2006 | Breed et al. | |
| 7,225,404 B1 | 5/2007 | Zilles et al. | |
| 7,812,815 B2 | 10/2010 | Banerjee et al. | |
| 7,878,977 B2 | 2/2011 | Mo et al. | |
| 8,009,022 B2 | 8/2011 | Kipman et al. | |
| 8,570,296 B2 | 10/2013 | Birnbaum et al. | |
| 8,638,989 B2 | 1/2014 | Holz | |
| 9,070,019 B2 | 6/2015 | Holz | |
| 9,092,953 B1 | 7/2015 | Mortimer et al. | |
| 9,153,028 B2 | 10/2015 | Holz | |
| 9,208,664 B1 | 12/2015 | Peters et al. | |
| 9,242,272 B2 | 1/2016 | Angle et al. | |
| 9,278,375 B2 | 3/2016 | Angle et al. | |
| 9,436,288 B2 | 9/2016 | Holz | |
| 9,436,998 B2 | 9/2016 | Holz | |
| 9,459,697 B2 | 10/2016 | Bedikian et al. | |
| 9,552,075 B2 | 1/2017 | Holz | |
| 9,558,555 B2 | 1/2017 | Holz | |
| 9,612,658 B2 | 4/2017 | Subramanian et al. | |
| 9,632,572 B2 | 4/2017 | Holz et al. | |
| 9,632,658 B2 | 4/2017 | Holz | |
| 9,646,201 B1 | 5/2017 | Horowitz | |
| 9,696,867 B2 | 7/2017 | Holz | |
| 9,697,643 B2 | 7/2017 | Holz | |
| 9,702,977 B2 | 7/2017 | Holz | |
| 9,721,383 B1 | 8/2017 | Horowitz et al. | |
| 9,733,715 B2 | 8/2017 | Holz | |
| 9,741,136 B2 | 8/2017 | Holz | |
| 9,747,696 B2 | 8/2017 | Holz | |
| 9,762,792 B2 | 9/2017 | Holz | |
| 9,766,709 B2 | 9/2017 | Holz | |
| 9,767,345 B2 | 9/2017 | Holz | |
| 9,767,613 B1 | 9/2017 | Bedikian et al. | |
| 9,784,247 B2 | 10/2017 | Eriksen et al. | |
| 9,841,819 B2 | 12/2017 | Carter et al. | |
| 9,857,876 B2 | 1/2018 | Hare et al. | |
| 9,866,097 B2 | 1/2018 | Guina et al. | |
| 9,868,449 B1 | 1/2018 | Holz et al. | |
| 9,881,386 B1 | 1/2018 | Holz | |
| 9,898,089 B2 | 2/2018 | Subramanian et al. | |
| 9,911,240 B2 | 3/2018 | Bedikian et al. | |
| 9,916,009 B2 | 3/2018 | Zagorsek et al. | |
| 9,927,522 B2 | 3/2018 | Holz | |
| 9,927,880 B2 | 3/2018 | Holz | |
| 9,934,609 B2 | 4/2018 | Horowitz et al. | |
| 9,945,660 B2 | 4/2018 | Holz | |
| 9,958,943 B2 | 5/2018 | Long et al. | |
| 9,977,120 B2 | 5/2018 | Carter et al. | |
| 9,983,686 B2 | 5/2018 | Horowitz et al. | |
| 9,986,153 B2 | 5/2018 | Holz | |
| 10,037,474 B2 | 7/2018 | Holz | |
| 10,042,510 B2 | 8/2018 | Holz | |
| 10,101,811 B2 | 10/2018 | Carter et al. | |
| 10,101,814 B2 | 10/2018 | Carter et al. | |
| 10,139,918 B2 | 11/2018 | Bedikian et al. | |
| 10,152,136 B2 | 12/2018 | Cohen et al. | |
| 10,152,824 B2 | 12/2018 | Holz | |
| 10,218,895 B2 | 2/2019 | Holz et al. | |
| 10,222,871 B2 | 3/2019 | Holz | |
| 10,241,639 B2 | 3/2019 | Holz | |
| 10,254,849 B2 | 4/2019 | Holz | |
| 10,268,275 B2 | 4/2019 | Carter et al. | |
| 10,281,553 B2 | 5/2019 | Holz | |
| 10,281,567 B2 | 5/2019 | Carter et al. | |
| 10,281,987 B1 | 5/2019 | Yang et al. | |
| 10,318,010 B2 | 6/2019 | Horowitz | |
| 10,348,959 B2 | 7/2019 | Holz | |
| 10,353,532 B1 | 7/2019 | Holz et al. | |
| 10,366,297 B2 | 7/2019 | Holz | |
| 10,380,795 B2 | 8/2019 | Horowitz et al. | |
| 10,410,411 B2 | 9/2019 | Holz | |
| 10,423,226 B2 | 9/2019 | Chen et al. | |
| 10,429,943 B2 | 10/2019 | Horowitz et al. | |
| 10,444,842 B2 | 10/2019 | Long et al. | |
| 10,452,151 B2 | 10/2019 | Zagorsek et al. | |
| 10,452,154 B2 | 10/2019 | Cohen et al. | |
| 10,459,530 B2 | 10/2019 | Holz | |
| 10,496,175 B2 | 12/2019 | Long et al. | |
| 10,497,358 B2 | 12/2019 | Tester et al. | |
| 10,531,212 B2 | 1/2020 | Long et al. | |
| 10,564,799 B2 | 2/2020 | Holz | |
| 10,565,784 B2 | 2/2020 | Holz | |
| 10,579,156 B2 | 3/2020 | Horowitz | |
| 10,585,193 B2 | 3/2020 | Holz | |
| 10,620,709 B2 | 4/2020 | Holz | |
| 10,620,775 B2 | 4/2020 | Holz | |
| 10,635,185 B2 | 4/2020 | Cohen et al. | |
| 10,638,036 B2 | 4/2020 | Holz | |
| 10,656,720 B1 | 5/2020 | Holz | |
| 10,671,172 B2 | 6/2020 | Holz | |
| 10,685,538 B2 | 6/2020 | Carter et al. | |
| 10,725,555 B2 | 7/2020 | Holz | |
| 10,739,862 B2 | 8/2020 | Bedikian et al. | |
| 10,755,538 B2 | 8/2020 | Carter et al. | |
| 10,767,982 B2 | 9/2020 | Holz | |
| 10,768,708 B1 | 9/2020 | Sills et al. | |
| 10,782,657 B2 | 9/2020 | Gordon et al. | |
| 10,782,847 B2 | 9/2020 | Holz | |
| 10,817,130 B2 | 10/2020 | Holz | |
| 10,832,470 B2 | 11/2020 | Horowitz et al. | |
| 10,846,942 B1 | 11/2020 | Horowitz et al. | |
| 10,901,519 B2 | 1/2021 | Holz | |
| 10,911,861 B2 | 2/2021 | Buckland et al. | |
| 10,915,177 B2 | 2/2021 | Carter et al. | |
| 10,921,949 B2 | 2/2021 | Holz et al. | |
| 10,930,123 B2 | 2/2021 | Carter et al. | |
| 10,936,022 B2 | 3/2021 | Holz et al. | |
| 10,936,082 B2 | 3/2021 | Horowitz et al. | |
| 10,936,145 B2 | 3/2021 | Holz | |
| 2003/0210259 A1 | 11/2003 | Liu et al. | |
| 2005/0154306 A1 | 7/2005 | Burgher et al. | |
| 2006/0232747 A1 | 10/2006 | Thornton et al. | |
| 2010/0128112 A1 | 5/2010 | Marti et al. | |
| 2010/0302015 A1* | 12/2010 | Kipman | G06F 3/011 340/407.1 |
| 2011/0199342 A1 | 8/2011 | Vartanian et al. | |
| 2012/0223880 A1 | 9/2012 | Birnbaum et al. | |
| 2012/0315605 A1 | 12/2012 | Cho | |
| 2013/0035582 A1 | 2/2013 | Radulescu et al. | |
| 2013/0100008 A1 | 4/2013 | Marti et al. | |
| 2013/0346050 A1 | 12/2013 | Kim et al. | |
| 2014/0265727 A1 | 9/2014 | Berte | |
| 2014/0281655 A1 | 9/2014 | Angle et al. | |
| 2016/0104452 A1 | 4/2016 | Guan et al. | |
| 2016/0124080 A1 | 5/2016 | Carter et al. | |
| 2016/0167090 A1 | 6/2016 | Reynolds et al. | |
| 2016/0246374 A1 | 8/2016 | Carter et al. | |
| 2016/0249150 A1 | 8/2016 | Carter et al. | |
| 2016/0320843 A1 | 11/2016 | Long et al. | |
| 2017/0018171 A1 | 1/2017 | Carter et al. | |
| 2017/0153707 A1 | 6/2017 | Subramanian et al. | |
| 2017/0193768 A1 | 7/2017 | Long et al. | |
| 2017/0278051 A1 | 9/2017 | Cohn | |
| 2017/0366908 A1 | 12/2017 | Long et al. | |
| 2018/0004291 A1* | 1/2018 | Dauhajre | G06F 3/016 |
| 2018/0039333 A1 | 2/2018 | Carter et al. | |
| 2018/0047259 A1 | 2/2018 | Carter et al. | |

(56) References Cited

U.S. PATENT DOCUMENTS

| | | | |
|---|---|---|---|
| 2018/0081519 A1 | 3/2018 | Kim | |
| 2018/0151035 A1* | 5/2018 | Maalouf | G06F 3/016 |

FOREIGN PATENT DOCUMENTS

| | | | |
|---|---|---|---|
| CN | 107407969 A | 11/2017 | |
| CN | 107534810 A | 1/2018 | |
| EP | 2995096 A1 | 3/2016 | |
| EP | 3195089 A1 | 7/2017 | |
| EP | 2995096 B1 | 12/2017 | |
| EP | 3259653 A1 | 12/2017 | |
| EP | 3259654 A1 | 12/2017 | |
| GB | 2464117 A | 11/2008 | |
| GB | 251884 A | 6/2013 | |
| GB | 2464117 B | 1/2015 | |
| GB | 2513884 B | 6/2015 | |
| JP | 3913496 B2 | 2/2007 | |
| JP | 2016530740 A | 9/2016 | |
| KR | 20160006708 A | 1/2016 | |
| KR | 20170054394 A | 5/2017 | |
| KR | 20170116161 A | 10/2017 | |
| KR | 20170116162 A | 10/2017 | |
| MX | 2017002716 A | 5/2017 | |
| WO | 9639754 A1 | 12/1996 | |
| WO | 2014143942 A3 | 11/2014 | |
| WO | 2014181084 A1 | 11/2014 | |
| WO | 2016038347 A1 | 3/2016 | |
| WO | 2016132141 A1 | 8/2016 | |
| WO | 2016132144 A1 | 8/2016 | |
| WO | 2017009661 A1 | 1/2017 | |
| WO | 2017118852 A1 | 7/2017 | |
| WO | 2018024788 A1 | 2/2018 | |
| WO | 2018029460 A1 | 2/2018 | |
| ZA | 201508936 B | 1/2017 | |

OTHER PUBLICATIONS

Ries, Marlo, et al., "Real-time 3D target tracking in MRI guided focused ultrasound ablations in moving tissues", Magnetic Resonance in Medicine, Sep. 27, 2010.

Rutsch, Matthias, et al., "Extending the receive performance of phased ultrasonic transducer arrays in air down to 40 kHz and below", 2015 IEEE International Ultrasonics Symposium (IUS), Oct. 21-24, 2015.

Sahoo, Deepak Ranjan Sahoo, et al., "JOLED: A Mid-air Display based on Electrostatic Rotation of Levitated Janus Objects", UIST 2016, Oct. 16-19, 2016, Tokyo, Japan.

Sand, Antti, et al., "Head-mounted display with mid-air tactile feedback", VRST '15: Proceedings of the 21st ACM Symposium on Virtual Reality Software and Technology, Nov. 2015, pp. 51-58.

Schofield, Tim, "Ultrahaptics Demo at CES 2015: Feeling Without Touching", https://www.youtube.com/watch?v=zJK7IF91jmQ, Jan. 13, 2015.

Seplmezan, Daniel, et al., "SkinHaptics: Ultrasound Focused in the Hand Creates Tactile Sensations", https://www.youtube.com/watch?v=DR4LBFKv5_Y, Multi-Sensory Devices Group, Mar. 13, 2016.

Shinoda, Hiroyuki, "Tactile Interaction with 3D Images", IDW '10, pp. 1743-1746, https://hapislab.org/public/hiroyuki_shinoda/research/pdf/10IDW_shinoda.pdf.

Shinoda, Hiroyuki, "What if sense of touch is transmitted in the air?", https://www.youtube.com/watch? u=kgcu4NAOXEO, TEDxUTokyoSalon, May 28, 2015.

Smith, Chris, "Researchers have developed holograms that you can actually touch", BGR, Tech, Dec. 25, 2015.

Subramanian, Sriram, et al., "Mid-Air Haptics and Displays: Systems for Un-instrumented Mid-Air Interactions", CHI'16 Extended Abstracts, May 07-12, 2016, San Jose, Ca, USA.

Subramnaian, Sriram, "Levitation using sound waves", https://www.youtube.com/watch?v=wDzhIW-rKvM, University of Sussex—Communications and External Affairs, Oct. 28, 2015.

Takahashi, Masafiimi, et al., "Large aperture Airborne Ultrasound Tactile Display using distributed array units", Proceedings of SICE Annual Conference 2010, 2010, pp. 359-362.

Tournat, Vincent, "Introductory Lecture on Nonlinear Acoustics", CNRS, Conference lecture, Oct. 2015.

Whymark, R.R., "Acoustic field positioning for containerless processing", Ultrasonics, vol. 13, Issue 6, Nov. 1975, pp. 251-261.

Wilson, Graham, et al., "Perception of Ultrasonic Haptic Feedback on the Hand: Localisation and Apparent Motion", CHI 2014, Apr. 26-May 1, 2014, Toronto, Ontario, Canada.

Wilson, Graham, et al., "Perception of Ultrasonic Haptic Feedback on the Hand: Localisation and Apparent Motion Youtube", https://www.youtube.com/watch?v=KIC7Q1ri2z4, ACM, Mar. 27, 2014.

Wong, William G., "Ultrasonics Brings Haptics to Augmented and Virtual Reality", Electronic Design, Nov. 2, 2016.

Wooh, Shi-Chang, et al., "Optimization of Ultrasonic Phased Arrays", Review of Progress in Quantitative Nondestructive Evaluation, vol. 17, edited by D.O. Thompson and D.E. Chimenti, Plenum Press, New York, 1998.

Yin, Yaboo, "Non-Contact Object Transportation Using Near-Field Acoustic Levitation Induced by Ultrasonic Flexural Waves", A dissertation submitted to the Graduate Faculty of North Carolina State University In partial fulfillment of the Requirements for the degree of Doctor of Philosophy, Mechanical Engineering, Raleigh, NC 2007.

Yirka, Bob, "Researchers use sound waves to levitate objects in three dimensions", Phys.org, Jan. 6, 2014.

Yoshino, Kazuma, et al., "Contactless Touch Interface Supporting Blind Touch Interaction by Aerial Tactile Stimulation", IEEE Haptics Symposium 2014 23-26 Feb., Houston, Tx, USA.

Yoshino, Kazuma, et al., "Measuring Visio-Tactile threshold for Visio-Tactile Projector", SICE Annual Conference 2012, Aug. 20-23, 2012, Akita University, Akita, Japan.

Zeng, Xiazheng, et al., "Evaluation of the angular spectrum approach for simulations of near-field pressures", J. Acoust. Soc. Am. 123 (1) Jan. 2008.

Zhou, Yufeng, "High intensity focused ultrasound in clinical tumor ablation", World Journal of Clinical Oncology 2(1):8-27, Jan. 2011.

"Sound effects" and "vibration tactile feedback" are effective for improving SoA (self-independence) in the VR Interface, Seamless, Mar. 18, 2017.

"A Tangible Hologram: control the dream", https://old.computerra.ru/terralab/multimedia/450201/, Archive Multimedia, Aug. 17, 20009.

"Airborne Ultrasound Tactile Display", https://www.youtube.com/watch?v=hSf2-jmOSsQ, ShinodaLab, Jun. 30, 2008.

"DigInfo TV", https://www.youtube.com/watch?v=N8G7PSN9m0Y, Ikinamo Japan, Oct. 8, 2011.

"DIY acoustic deviation device", https://www.youtube.com/watch?v=fy6D6ZZ_11A, Mar. 24, 2014.

"Fast Pressure Field Simulations of Large Ultrasound Phased Arrays", https://www.egr.msu.edu/-mcgough/research/ienny/main.htm, Sep. 2005.

"Feeling virtual objects in mid-air using ultrasound", Kurzweil, Tracking the acceleration of intelligence, Dec. 3, 2014.

"From science fiction to reality—sonic tractor beam invented", University of Bristol, Press Release, Oct. 27, 2015.

"Haptoclone", https://www.youtube.com/watch?v=0nlnRpFoBLo, ShinadoLab, Aug. 8, 2015.

"Holographic acoustic elements for manipulation of levitated objects", https://www.youtube.com/watch?v=TVE3_9tHXL8, ScienceVio, Oct. 27, 2015.

"Holographic Touch Interface in a CAR?", https://www.youtube.com/watch?v=sD7J2t7D1jE&t=209s, Linus Tech Tips, Jan. 10, 2017.

"Immersion Research—More details about Touch Hologram in Mid-Air", https://www.youtube.com/watch?v=Palpd9Fa7ns, Immersion Recherche, Jan. 4, 2017.

"Immersion Research—Touch Hologram in Mid-Air", https://www.youtube.com/watch?v=17wf-gqc-X8, Immersion Recherche, Dec. 20, 2016.

"Lizards running on a plate of water", https://www.youtube.com/watch?v=Lb-kqHcbdPA, gigazine, Oct. 23, 2014.

"Microsoft HoloLens", https://shiropen.com/2016/12/22/22148/, Seamless, Dec. 22, 2016.

(56) References Cited

OTHER PUBLICATIONS

"Phased Array Antenna—Radartutorial", https://www.radartutorial.eu/06.antennas/Phased%20Array%20Antenna.en.html.

"Phased arrays and Jan C Somer", https://www.ob-ultrasound.net/somers.html.

"Pinch and stroke aerial images created by HORN (Hapt-Optic ReconstructioN)", https://www.youtube.com/watch?v=7Ibdv0rtiDE, ShinadoLab, Aug. 5, 2014, Demonstration at SIGGRAPH 2014 Emerging Technologies, Aug. 10-14, 2014, Vancouver.

"Pixie Dust: IoT is old. What is the magic of the post "things" era?", Gizmodo, Interview with Yoichi Ochiai, Apr. 20, 2015.

"Press focused ultrasonic waves without touch", https://www.youtube.com/watch?v=CE4WsYncNa4, Nov. 2012.

"Research brings 'smart hands' closer to reality", Science Daily, University of Sussex, Apr. 11, 2016.

"See it, touch it, feel it: Team develops invisible 3-D haptic shape (w/ Video)", Phys.org, University of Bristol, Dec. 2, 2014.

"SIGGRAPH 2015—Emerging Technologies Contributor : MidAir Touch Display", https://www.youtube.com/watch?v=TJYuJd148kc, ACMSIGGRAPH, Aug. 21, 2015.

"Sound levitation—Science with Brown—El Hormiguero 3.0", https://www.youtube.com/watch?v=j31a1Pg202Q8&dist=PLuXVgTp-XEU8_MTUcQjKrf GkidDOHL3H&index=9, CienciaXplora, Jun. 9, 2015.

"The virtual reality power of world-class Japanese students", https://www.atmarkit.cojp/ait/articles/1211/30/news012.html, Nov. 30, 2012, @IT.

"Touchable Holography", https://www.youtube.com/watch?v=Y-P1zZAcPuw, ShinodaLab, Jul. 16, 2009.

"Touched Virtual Reality", http://parkitc.u-tokyo.acjp/t-prittime/kiji/_42_1.php, Faculty of Engineering, The University of Tokyo, Department of Counting Engineering, vol. 39, Oct. 2010.

"Touching, Feeling, Telling", http://www.techtile.org/activities/techtile_ex2/, Techtile YCAM InterLab, Nov. 30, 2008.

"Ultrasonic 3D Haptic Hologram, demo at whc15", https://www.youtube.com/watch?v=s7JeCVB7Qvg, ShinadoLab, Jul. 17, 2015.

"Ultrasonic force field provides tactile sensations in midair", New Atlas, Science, Oct. 11, 2013.

"Ultrasonic levitation", https://www.youtube.com/watch?v=6hE6KjLUkiw, Nature video, Oct. 27, 2015.

"Ultrasound Physics—Transducer arrays", https://www.youtube.com/watch?v=AG2ITLh1eUo, Examrefresh, Jul. 6, 2013.

"Ultrasound to give feel to games", BBC News, Sep. 2, 2008.

"Visual and Tactile Cues for High-Speed Interaction", https://www.youtube.com/watch?v=DWeAXUVrqjE, Ishikawa Group Laboratory, May 15, 2013.

"Visuo-Tactile Projector", https://www.youtube.com/watch?v=Bb0hNMxxewg, ShinodaLab, May 14, 2013.

Alexander, Jason, et al., "Adding haptic feedback to mobile TV", Proceedings of the International Conference on Human Factors in Computing Systems, CHI 2011, Extended Abstracts Volume, Vancouver, BC, Canada, May 7-12, 2011.

Asamura, Naoya, et al., "Selectively stimulating skin receptors for tactile display", IEEE Computer Graphics and Applications, Nov./Dec. 1998, 18(6):32-37.

Austeng, A., et al., "Sparse 2-D arrays for 3-D phased array imaging—design methods", IEEE Transactions on Ultrasonics, Ferroelectrics, and Frequency Control, vol. 49, No. 8, pp. 1073-1086, Aug. 2002.

Ballard, John R., et al., "Adaptive Transthoracic Refocusing of Dual-Mode Ultrasound Arrays", IEEE Trans Biomed Eng. Jan. 2010; 57(1): 93-102.

Bobkova, Svetlana, "Focusing of high intensity ultrasound through the rib cage using a therapeutic random phased array", Ultrasound Med Biol. Jun. 2010; 36(6): 888-906.

Carter, Tom, "Feeling without touching: where the virtual meets reality", https://www.youtube.com/watch?v=prKDcTxB_eY, Opposable VR, Mar. 16, 2015.

Carter, Tom, et al., "UltraHaptics: Multi-Point Mid-Air Haptic Feedback for Touch Surfaces", https://www.youtube.com/watch?v=2QkbVr4J7CM, BristolIG lab, Sep. 26, 2013, Published and presented at UIST '13.

Carter, Tom, et al., "UltraHaptics: Multi-Point Mid-Air Haptic Feedback for Touch Surfaces", UIST 2013, Oct. 3-11, 2013, St Andrews, United Kingdom.

Carter, Tom, et al., "Ultra-Tangibles: Creating Movable Tangible Objects on Interactive Tables Youtube", https://www.youtube.com/watch?v=CVxr7T7DBn0, BristollG lab, Dec. 1, 2011.

Casper, Andrew, "Electronically Scanned Ultrasound Phased Array", https://www.youtube.com/watch?v=sePIRYpSL50, Nov. 6,2011.

Casper, Andrew, et al., "Realtime Control of Multiple-focus Phased Array Heating Patterns Based on Noninvasive Ultrasound Thermography", IEEE Trans Biomed Eng. Jan. 2012; 59(1): 95-105.

Ciglar, Miha, "An ultrasound based instrument generating audible and tactile sound", Proceedings of the 2010 Conference on New Interfaces for Musical Expression (NIME 2010), Sydney, Australia.

Cochard, Etienne, "Ultrasonic focusing through the ribs using the DORT method", Medical Physics, American Association of Physicists inMedicine, 2009,36 (8), pp. 3495-503.

Dickey, Trevor C., et al., "Intense focused ultrasound can reliably induce sensations in human test subjects in a manner correlated with the density of their mechanoreceptors", Ultrasound Med Biol. Jan. 2012; 38(1): 85-90.

Ebbini, E.S., et al., "Multiple-focus ultrasound phased-array pattern synthesis: optimal driving-signal distributions for hyperthermia", IEEE Transactions on Ultrasonics, Ferroelectrics, and Frequency Control, vol. 36, Issue 5, Sep. 1989.

Filonenko, E. A., et al., "Heating of Biological Tissues by Two-Dimensional Phased Arrays with Random and Regular element Distributions", Acoustical Physics, Jan. 2004, 50(2):222-231.

Freeman, Euan, et al., "Tactile Feedback for Above-Device Gesture Interfaces: Adding Touch to Touchless Interactions", ICMI '14: Proceedings of the 16th International Conference on Multimodal Interaction Nov. 2014.

Gan, Woon-Seng, et al., "A review of parametric acoustic array in air", Applied Acoustics, vol. 73, Issue 12, Dec. 2012, pp. 1211-1219.

Gavrilov, Leonid Rafaliovich, "The possibility of generating focal regions of complex configurations in application to the problems of stimulation of human receptor structures by focused ultrasound", Acoustical Physics, 2008, vol. 54, No. 2, pp. 269-278, 10.1134/S1063771008020152.

Gavrilov, Leonid R., "Use of focused ultrasound for stimulation of nerve structures", Ultrasonics, May 1984, 22, 132-8.

Gavrilov, L.R., "Use of Phased Arrays for Generation and Steering of Considarable Number of FOCI", XIII Session of the Russian Acoustical Society, Moscow, Aug. 25-29, 2003.

Gistvik, Helena, et al., "Effects of dead elements in ultrasound transducers", Master of Science Thesis in Medical Engineenng, 2013, KTH Technology and Health, Stockholm, Sweden.

Happy, et al., "Rendering 3D Haptic Shapes in Mid-Air using Ultrasound", Journal of Management Engineering and Information Technology (JMEIT) vol. -2, Issue- 3, Jun. 2015, ISSN: 2394-8124.

Hasegawa, Keisuke, et al., "Aerial Display of Vibrotactile Sensation with High Spatial-Temporal Resolution using Large-Aperture Airborne Ultrasound Phased Array", IEEE World Haptics Conference Apr. 14-18, 2014, Daejeon, Korea.

Hertzberg, Yoni, et al., "Towards multifocal ultrasonic neural stimulation: Pattern generation algorithms", Journal of Neural Engineering, Oct. 2010, 7(5):056002.

Hoshi, Takayuki, et al., "Adding Tactile Reaction to Hologram", Robot and Human Interactive Communication, 2009. RO-MAN 2009. The 18th IEEE International Symposium on Robot and Human Interactive Communication, Toyama, Japan, Set. 27-Oct. 2, 2009.

Hoshi, Takayuki, "Development of aerial-input and aerial-tactile-feedback system", 2011 IEEE World Haptics conference, WHC 2011.

Hoshi, Takayuki, et al., "Non-contact Tactile Display Based on Radiation Pressure of Airborne Ultrasound", IEEE Transactions on Haptics, vol. 3, No. 3, pp. 155-165, Jul.-Sep. 2010.

(56) References Cited

OTHER PUBLICATIONS

Hoshi, Takayuki, et al., "Non-contact Tactile Sensation Synthesized by Ultrasound Transducers", World Haptics 2009—Third Joint EuroHaptics conference and Symposium on Haptic Interfaces for Virtual Environment and Teleoperator Systems, Salt Lake City, UT, USA, Mar. 18-20, 2009.
Hoshi, Takayuki, et al., "Touchable Holography", SIGGRAPH 2009, New Orleans, Louisiana, Aug. 3-7, 2009.
Humphreys, Sean, "Ultrasonic Haptic Feedback: The Next Step in VR?", VGU, Feb. 26, 2015.
Inoue, Seki, et al., "A Pinchable Aerial Virtual Sphere by Acoustic Ultrasound Stationary Wave", IEEE Haptics Symposiumv Feb. 23-26, 2014 Houston, Tx, USA.
Inoue, Seki, et al., "Active Touch Perception Produced by Airborne Ultrasonic Haptic Hologram", 2015 IEEE World Haptics Conference (WHC) Northwestern University, Jun. 22-26, 2015. Evanston, Il, USA.
Inoue, Seki, et al., "Horn: the hapt-optic reconstruction", SIGGRAPH '14: ACM SIGGRAPH 2014 Emerging Technologies, Jul. 2014, Article 11.
Ito, Mitsuro, et al., "High Spatial Resolution Midair Tactile Display Using 70 kHz Ultrasound", Conference: International Conference on Human Haptic Sensing and Touch Enabled Computer Applications, Jul. 2016.
Iwamoto, Takayuki, et al., "Airbourne Ultrasound Tactile Display: Supplement", International Conference on computer Graphics and Interactive Techniques, SIGGRAPH 2008, Los Angeles, California, Aug. 11-15, 2008, New Tech Demos Proceedings.
Iwamoto, Takayuki, et al., "Non-contact Method for Producing Tactile Sensation Using Airborne Ultrasound", M. Ferre (Ed.): EuroHaptics 2008, LNCS 5024, pp. 504-513, 2008, Springer-Verlag Berlin Heidelberg 2008.
Iwamoto, Takayuki, et al., "Two Dimensional Radiation Pressure Tactile Display", SICE Annual Conference 2005 in Okayama, Aug. 8-10, 2005 Okayama University, Japan.
Iwamoto, T., et al., "Two Dimensional Scanning Tactile Display using Ultrasound Radiation Pressure", Haptic Interfaces for Virtual Environment and Teleoperator Systems, 2006 14th Symposium on Haptics Interfaces for Virtual Environment andTeleoperator Systems 2006—Proceedings. 2006. 57-61. 10.1109NR.2006.137.
Iwamoto, Takayuki, et al., "Ultrasound tactile display fro stress field reproduction—examination of non-vibratory tactile apparent movement", Apr. 2005, DOI:10.1109/WHC.2005.140, Eurohaptics Conference, 2005 and Symposium on Haptic Interfaces for Virtual Environment and Teleoperator Systems, 2005. World Haptics 2005.
Jozuka, Emiko, "How Haptics Make Holograms You Can Touch", Motherboard, Tech by Vice, May 11, 2015.
Kahn, Jeremy, "Meet the Man Who Made Virtual Reality 'Feel' More Real", Bloomberg, Feb. 2, 2016.
Kazys, R., et al., "Investigation of focusing possibilities of convex and cylindrical phased arrays", ULTRAGARSAS (ULTRASOUND), vol. 64, No. 4, 2008.
Korres, Georgios, et al., "Characterization of Ultrasound Tactile Display", Haptics: Perception, Devices, Control, and Applications. EuroHaptics 2016. Lecture Notes in Computer Science, vol. 9774, 2016.
Korres, Georgios, et al., "Haptogram: Ultrasonic Point-Cloud Tactile Stimulation", IEEE Access vol. 4, 2016, pp. 7758-7769.
Long, B.et al. "Rendering Volumetric Haptic Shapes in Mid-Air using Ultrasound", https://www.youtube.com/watch?v=kao05cY1aHk, BristollG lab, Nov. 21, 2014.
Long, Benjamin, et al., "Rendering Volumetric Haptic Shapes in Mid-Air using Ultrasound", Proceedings of ACM SIGGRAPH Asia 2014. ACM Transactions on Graphics, 33(6).
Makino, Yasutoshi, et al., "Selective stimulation to skin receptors by suction pressure control", SICE 2004 Annual conference Sapporo, Aug. 4-6, 2004, Hokkaido Institute of Technology, Japan.
Marshall, Mark T., et al., "Ultra-Tangibles: Creating Movable Tangible Objects on Interactive Tables", CHI 2021, May 5-10, 2021, Austin, Texas, USA.
Marzo, Asier, "Acoustic Holograms that Levitate Particles", https://www.youtube.com/watch?v=g_EM1y4MKSc, BristollG lab, Oct. 27, 2015.
Marzo, Asier, et al., "Ghost Touch: Turning Surfaces into Interactive Tangible Canvases with Focused Ultrasound", ITS '15, Nov. 15-18, 2015, Funchal, Portugal.
Marzo, Asier, et al., "Holographic acoustic elements for manipulation of levitated objects", Nature Communications, Oct. 2015.
McGough, Robert J., et al., "An efficient grid sectoring method for calculations of the near-field pressure generated by a circular piston", J Acoust Soc Am. May 2004; 115(5 Pt 1): 1942-1954.
Monnai, Yasuaki, et al., "HaptoMime (full version): Mid-air haptic interaction with a floating virtual screen", https://www.youtube.com/watch?v=uARGRIpCWg8, ShinadoLab, Oct. 5, 2014.
Monnai, Yasuaki, et al., "HaptoMime: mid-air haptic interaction with a floating virtual screen", UIST '14: Proceedings of the 27th annual ACM symposium on User interface software and technology, Oct. 2014, pp. 663-667.
Obrist, Marianna, et al., "Talking about Tactile Experiences", CHI '13 Proceedings of the SIGCHI Conference on Human Factors in Computing Systems, Apr. 2013.
Ochiai, Yoichi, et al., "Pixie Dust: Graphical Levitation System", https://www.youtube.com/watch?v=NLgD3EtxwdY.
Ochiai, Yoichi, et al., "Three-Dimensional Mid-Air Acoustic Manipulation by Ultrasonic Phased Arrays", Dec. 2013 PLoS One 9(5).
Ochiai, Yoichi, et al., "Three-Dimensional Mid-Air Acoustic Manipulation Youtube", https://www.youtube.com/watch?v=odJxJRAxdFU, Dec. 31, 2013.
Omirou, Themis, et al., "LeviPath: Modular Acoustic Levitation for 3D Path Visualisations", CHI '15 Proceedings of the 33rd Annual ACM Conference on Human Factors in Computing Systems, Apr. 2015, pp. 309-312.
Omirou, Themis, et al., "LeviPath: Modular Acoustic Levitation for 3D Path Visualisations", https://www.youtube.com/watch?v=xbAsPDQ1x4o, ACM SIGCHI, May 4, 2016.
Otaduy, Miguel a., et al., "Haptic Technologies for Direct Touch in Virtual Reality", ACM SIGGRAPH Courses 2016.
Palovuori, Karri, et al., "Bidirectional touch interaction for immaterial displays", AcademicMindTrek '14: Proceedings of the 18th International Academic MindTrek Conference: Media Business, Management, Content & Services, Nov. 2014, pp. 74-76.
Pernot, Mathieu, et al., "3-D real-time motion correction in high-intensity focused ultrasound therapy", Ultrasound in Medicine & Biology, Elsevier, 2004, 30 (9), pp. 1239-49.
Shinoda, Hiroyuki, "Tactile Interaction with 3D Images", IDW '10, pp. 1743-1746, https://hapislab.org/public/hiroyuki_shinoda/research/pdf/10IDW_shinoda.pdf.
Shinoda, Hiroyuki, "What if sense of touch is transmitted in the air?", https://www.youtube.com/watch? v=kgcu4NAOXEO, TEDxUTokyoSalon, May 28, 2015.
Subramanian, Sriram, et al., "Mid-Air Haptics and Displays: Systems for Un- instrumented Mid-Air Interactions", CHI'16 Extended Abstracts, May 7-12, 2016, San Jose, CA, USA.
Yoshino, Kazuma, et al., "Contactless Touch Interface Supporting Blind Touch Interaction by Aerial Tactile Stimulation", IEEE Haptics Symposium Feb. 23-26. 2014., Houston, Tx, USA.

\* cited by examiner

MID-AIR ULTRASONIC HAPTIC INTERFACE FOR IMMERSIVE COMPUTING ENVIRONMENTS

BACKGROUND OF THE INVENTION

Field of the Invention

The present invention generally relates to interfacing with immersive computing environments. More specifically, the present invention concerns the use of ultrasonic energy to provide mid-air tactile sensations with the hands (or other body parts) as a user interacts with objects in an immersive computing environment.

Description of the Related Art

Haptic interactions involve systems and apparatus that impart kinesthetic or tactile sensations to a user in the course of user engagement with an object. These sensations may be created through the use of vibrations or force-feedback generated by mechanical sensors in a control device. Vibrations are typically characterized by oscillation of a fluid or an elastic solid whose equilibrium has been disturbed. Force-feedback implies physical resistance akin to attempting to 'turn into' a wall (i.e., the wall would preclude the turn).

One of the earliest haptic devices was a telephone handset paired with a similarly designed handset to form a closed loop feedback system. The system would present variations in pressure to a user at one handset as conveyed by the user of the other handset. Compression at one end of the phone line would cause an increase in pressure and/or expansion at the other end.

Mobile phones and handheld computing devices have continued that trend by integrating haptic feedback in the form of 'ring' indicators like those found in early paging devices as well as user touch or device interaction response. In the latter example—sometimes referred to as surface haptics—the mobile device will produce a variety of forces on the finger of a user as the user engages the surfaces of the touchscreen. These forces simulate a typing experience or indicate selection or actuation of a device feature or function.

Haptic interactions have also been a common feature for arcade gaming consoles. For example, arcade-based motorbike and driving games use haptic feedback in handlebars or steering wheels. The handlebars or steering wheel vibrate in the event of a collision or traversal of rough terrain. The handlebars also provide force-feedback in the event of a controlled game object encountering a larger or perhaps immovable object.

Home entertainment systems, too, have imparted tactile experiences in the form of joysticks and controllers. Nintendo and Sony Computer Entertainment respectively introduced the Nintendo 64 RumblePak and Sony PlayStation DualShock controller. The RumblePak was a removable, battery-operated device with a single motor plugged into a Nintendo controller; the DualShock involved two vibration motors housed within the handles of the game controller and drew power directly from the attached gaming console. Both devices would provide vibrations responsive to in-game interactions such as explosions, collisions, or other high-intensity events.

All of the foregoing instances of haptic interactions require a physical engagement with the vibration- or feedback-driven object. Physical engagement is not as practical with the increasing prevalence of immersive computing technologies. Immersive computing is generally representative of technologies that blur-or completely erase-the line between the physical world and the digital or simulated world thereby creating an immersive experience.

Immersive computing includes virtual reality (VR) technologies, which may use computer simulated imagery and environments to replace the real-world. VR technologies are typically effectuated through a user worn headset. Immersive computing also includes augmented reality (AR) technologies that involve a live or indirect view of the real-world supplemented by extra-sensory input. AR technologies are typically implemented in the context of glasses or other 'wearable' devices, but can also involve non-wearable technologies such as the use of projections and holograms, which constitute a type of immersive computing experience in its own right. Other exemplary forms of immersive computing include mixed reality (MR), extended-reality (XR), augmented virtuality (AV), three-dimensional displays, full domes, three-dimensional audio, omnidirectional treadmills, and machine olfaction. Immersive computing can be represented by any one or more of the foregoing technologies alone or in combination as well as in proactive and reactive engagements.

In many of the foregoing examples, the user is unlikely to engage with the likes of a surface or controller. Requiring physical engagement would negatively impact the usability and reality of the immersive computing environment. Efforts to effectuate a haptic experience that does not require the presence of a glove, vest, or hand-held control object have resulted in only a modicum of success.

Mid-air haptic experiences such as those offered by four-dimensional (4-D) cinema have largely been limited to the use of compressed air jets in conjunction with other physical experiences (e.g., vibrations, smoke machines, wind, and fog). Installation of the hardware apparatus required for such an experience is expensive and requires custom-built venues such as theme and amusement parks. In those instances where installation is economically possible, compressed air jets lack vertical resolution, precision control, and can create only very diffuse experiences such as blasts of air. These instances have been dismissed as gimmicky physical distractions that completely remove the user from an immersive experience rather than creating the same.

There is a need in the art for a mid-air haptic interface that imparts a degree of realism equal to that implemented by an immersive computing experience without the need for complex physical installations or other custom-designed venues. An interface is needed that allows for coverage of larger distances and provides for a wider range of interactions thereby allowing a user to extend an appendage into a broader workspace while providing for multiple points of or comprehensive sensation or interaction without sacrificing user comfort with respect to any such interaction.

SUMMARY OF THE PRESENTLY CLAIMED INVENTION

A first claimed embodiment of the present invention recites an ultrasonic system for haptic engagement in an immersive computing workspace. The system includes a processing system, a tracking device, a flat-panel two-dimensional ultrasound transducer array, and a driver. The processing system computes the interaction of a user with one or more virtual objects in the three-dimensional space corresponding to the immersive computing workspace while the tracking device, which is communicatively coupled to the processing system, tracks an appendage of the user interacting with the object in the three-dimensional immersive computing workspace. The tracking information is provided to the processing system. The flat-panel two-dimensional ultrasound transducer array includes a plurality of ultrasonic emitters that can produce multiple localized focal points of ultrasonic energy capable of individual perception by the user. The driver is communicatively coupled to the processing system and the ultrasound transducer array. The driver causes the plurality of ultrasonic emitters to create a mid-air tactile sensation at the appendage of the user through excitement of the one or more ultrasonic emitters in response to feedback from the processing system that is responsive to the tracking information from the tracking device.

A second claimed embodiment of the present invention also recites an ultrasonic system for haptic engagement in an immersive computing workspace. The system of the second claimed embodiment—like the first claimed embodiment—includes a processing system, tracking device, and driver. The system of the second claimed embodiment, however, includes a curved-panel ultrasound transducer array with a plurality of ultrasonic emitters that can produce multiple localized focal points of ultrasonic energy capable of individual perception by the user; the ultrasonic energy is generated through beamforming and constructive interference. The processing system of the second embodiment computes the interaction of the user with one or more virtual objects in the three-dimensional space corresponding to the immersive computing workspace. The tracking device, which is communicatively coupled to the processing system tracks an appendage of a user interacting with the object in the three-dimensional immersive computing workspace; the tracking device provides the tracking information to the processing system. The aforementioned driver is communicatively coupled to the processing system and the ultrasound transducer array. The driver causes the plurality of ultrasonic emitters to create a mid-air tactile sensation at the appendage of the user through excitement of the one or more ultrasonic emitters in response to feedback from the processing system that is responsive to the tracking information from the tracking device.

In the independently claimed embodiment of the present invention, an ultrasonic system for haptic engagement in an immersive computing workspace is also claimed. This claimed embodiment, too, recites a processing system, tracking device, and driver with functionality similar to those of the first and second claimed embodiment. The ultrasound array of the third claimed embodiment, however, is a flexible-array including a plurality of ultrasonic emitters that can produce multiple localized focal points of ultrasonic energy capable of individual perception by the user; the ultrasonic energy is generated through beamforming and constructive interference.

DETAILED DESCRIPTION

Figure 1A:
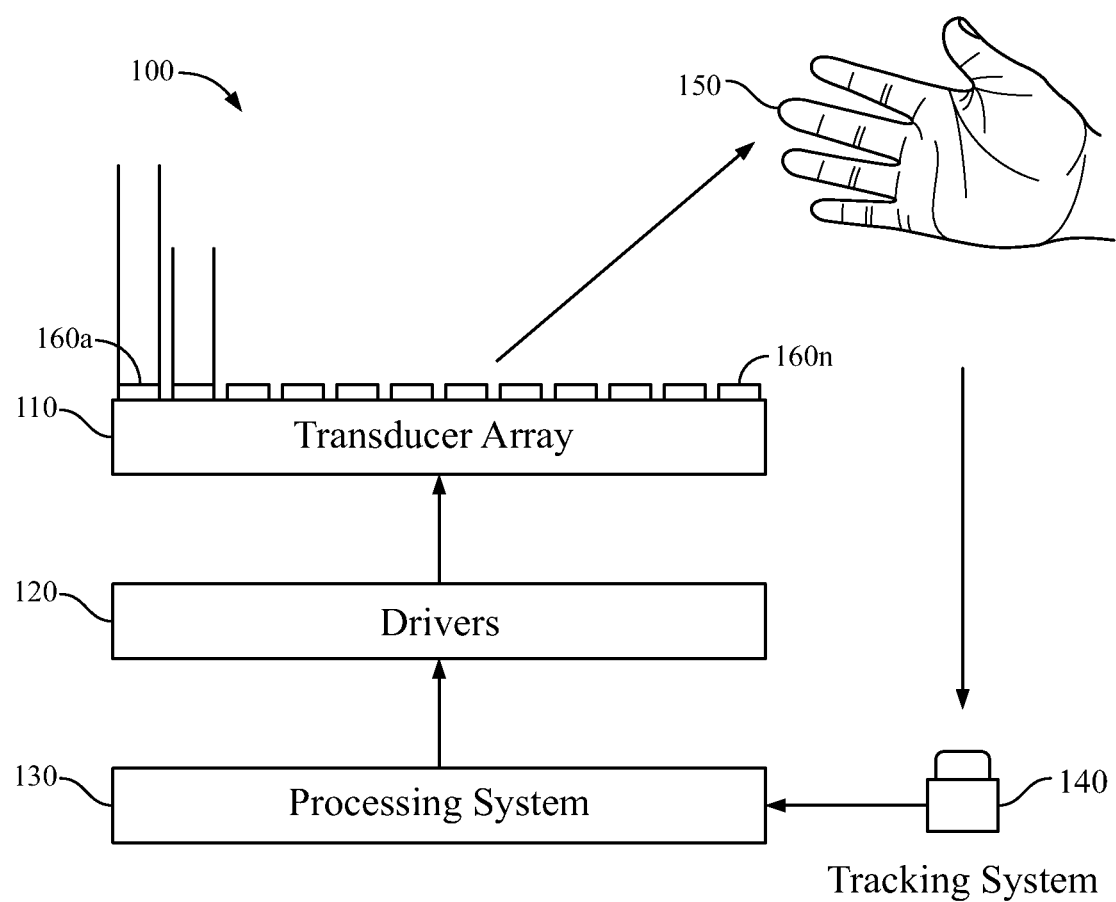
FIG. 1A illustrates a two-dimensional flat panel ultrasound system providing for tactile mid-air haptic feedback.

Disclosed herein is an ultrasound system for providing tactile mid-air haptic feedback. Embodiments of the present invention create a precise mid-air tactile sensation at and on one or both hands (or some other body part) of a user through use of one or more phased arrays of ultrasonic emitters.

Sound is a pressure wave that results from the vibration of the particles of the medium through which the sound wave is moving. An ultrasound transducer is a device that converts an electrical signal into an ultrasonic pressure wave through oscillation. The beam pattern of a transducer can be affected by the active transducer area, the ultrasound wavelength, and the sound velocity of the propagation medium. Ultrasonic transducers can likewise receive and aid in the processing of an ultrasonic signal or an interaction related thereto.

Through the use of software, it is possible to focus the output of an array of ultrasonic emitters having a precise frequency and modulation in a phased delay. The array can produce focal points of ultrasonic energy by way of constructive interference. These focal points provide sufficient radiation pressure to be felt by the skin of a user. A software driven ultrasonic system may thus produce steerable focal points of ultrasonic energy that can be controlled by varying the phase of the ultrasonics emitted by the system.

The ultrasound system disclosed as part of the present invention may take on any number of form factors. For example, the ultrasound system may be implemented as a flat panel. The ultrasound system may likewise be implemented as part of a curved panel. Various underlying components of the system such as drivers and processing devices may have a variety of form factors as well depending on a particular implementation and use case. For example, as illustrated in various portions of FIGS. 1A, 2A and 2B, certain system elements may be curved, certain elements may be two-dimensional, or certain embodiments may have a combination of curved and two-dimensional componentry.

Various multiple-array and three-dimensional configurations may allow for simultaneous haptic interaction at a number of angles. A multiple-array system using either a flat or curved panel display may be used in a table-based, ceiling-based, or wall-based installation. Polyhedral configurations such as a cube, a pyramid, or truncated pyramid may implement the flat or curved-panel design. Spherical, cylindrical, and conical designs (or at least partially spherical or conical designs) are also within the scope of the present invention through their implementation of the aforementioned curved panel arrays. The foregoing ultrasound systems may likewise be integrated into various objects such as furniture: a chair or table, for example. Flexible embodiments of an ultrasonic system are also disclosed. Such an embodiment may allow for increased portability of the ultrasound system and the immersive computing engagements provided by the same.

A particular form factor is intended to be used in the context of a particular user case, many of which are illustrated and described here. The various embodiments described herein are meant to allow for engagement with larger distances and performance of a greater range of user interactions. For example, a user may extend their arms and reach into a particular workspace versus simply 'pawing' at the extremes of the same.

Various form factors, too, may allow for a user experiencing feelings or sensations in a series of areas or focal points on a given appendage. For example, a user may encounter a sensation on both sides of a hand (palm and dorsal), on the palm of one hand and the dorsal side of another, or the dorsal side of both hands. 'Speaker bars' may allow for ultrasonic engagement at the waist level while standing or chest level while sitting. 'Halo' designs, too, could allow a user to experience ultrasonic sensations all around their body or relative to specific portions of their body as part of an omnidirectional experience.

The various form factors described herein are also meant to provide for more comfortable interactions. The presently disclosed invention is envisioned to be incorporated into any number of work-related and entertainment-related implementations. Such implementations might find a user engaged at a desk or work station for long hours. By providing a combination of multi-array configurations and/or three-dimensional ultrasound configurations, a user may experience more comfortable interactions with an immersive environment. For example, a user may allow their arms to rest on a desktop while utilizing their hands to engage with an ultrasonic system and workspace.

As suggested above, the disclosed ultrasound system may be utilized in combination with various immersive computing technologies and corresponding system and apparatus. For example, in a VR immersive experience, the user may utilize a head mounted display to generate a virtual environment in conjunction with the presently disclosed ultrasound system to provide haptic interactions with objects displayed in that environment. In an AR immersive experience, the user may utilize a set of transparent glasses to supplement a real-world environment while concurrently using the presently disclosed ultrasound system to provide haptic interactions.

The presently disclosed ultrasound system may also be used with projected or artificial images that do not require an AR or VR device to create an immersive experience. For example, embodiments of the present ultrasound system may be used in conjunction with a projection device displaying a two-dimensional image. Embodiments of the present ultrasound system may similarly be used with holographic projections of environments and objects. A three-dimensional projection may also be used in conjunction with embodiments of the present invention although some 3D projections may require the use of 3D glasses or some other worn visual device.

FIG. 1A illustrates a two-dimensional flat panel ultrasound system 100 providing for tactile mid-air haptic feedback. The system 100 as illustrated in FIG. 1A includes a two-dimensional ultrasound transducer array 110, a driver system 120, a processing system 130, and a tracking system 140. FIG. 1A further illustrates the hand 150 of a user interacting with the system 100.

The transducer array 110 of FIG. 1A is arranged as a flat panel of ultrasonic transducers $160_a \ldots 160_n$. Transducers $160_n$ in array 110 may be an open structure ultrasonic sensor. An ultrasonic sensor of this type may include a composite oscillating body that combines the oscillator and piezoelectric ceramics with a resonator. The resonator may have a funnel shape in order to efficiently radiate ultrasonic energy into a medium of interest (e.g., the air) while effectively concentrating waves from the air on center of the oscillator. A transducer as may be used in various embodiments of the present invention will have a given diameter, nominal operating frequency, sensitivity, sound pressure, and directivity. Subject to the requirements or limitations of any particular ultrasound system implementation, one of ordinary skill in the art may modify the configuration or substitute any particular ultrasound transducer while still remaining within the scope and spirit of the presently disclosed invention.

While the tracking system 140 of FIG. 1A is described as having been implemented in the context of a stereoscopic infrared camera, other technologies may utilized such as ultrasonic and radar. The stereoscopic camera distills a video signal into a coherent data set that can be processed into actionable symbolic abstractions by the driver system 120, processing system 130, and any additional computing hardware or systems communicatively coupled thereto. In an exemplary mode of operation, an infrared (IR) structured light source at the tracking system 140 emits a constant pattern onto a scene such as workspace 180 as discussed in the context of FIG. 1B. This pattern may be acquired by a CMOS two-dimensional camera correlated against a reference pattern at the tracking system 140.

The reference pattern is generated by capturing a plane at a known distance from each camera. When a speckle is projected on an object whose distance to the camera differs from that of the reference plane, the position of the speckle in the infrared image is shifted and measured by an image correlation process to generate a disparity map. The disparity map can then be used to calculate distance in real-space by way of triangulation.

The tracking system 140 senses the user hand 150 (or any other tracked body part) utilizing the tracking techniques identified above. For example, a user positions their hand 150 relative to the tracker 140 for the purpose of interacting with an object in an immersive computing environment. The immersive environment might be generated by a computing device and related hardware and software operating in conjunction with ultrasound system 100 including but not limited to processing system 130. For example, the computing device and related hardware and software operating in conjunction with ultrasound system 100 may be a VR system with a head mounted display or an AR system that projects a hologram of an object or objects into a real-world physical space. The tracking system 140 sends the real-time spatial data concerning the movement and position of the user hand 150 (e.g., the three-dimensional coordinates of the fingertips and palm or any other tracked body part) to the processing system 130. This three-dimensional positional information is processed by the processing system 130 to determine whether the user is in proximity to an object in a VR or AR space like that shown in the workspace 180 of FIG. 1B.

Processing system 130 is one or a set of processors or processing units (and supporting componentry) including but not limited to central processing units, graphics processing units, digital signal processing units, and field-programmable gate arrays. For example, in the case of a graphics processing unit (GPU), processing system 130 is inclusive of related electronic circuitry systems that allow for accelerated parallel processing for improved performance. The processing system may compute the virtual content in the immersive computing workspace, process the three-dimensional positional information from the tracking system to determine whether the user is in proximity to a virtual object, and translate information into coordinates that are transformed into phase maps and intensity values for the transducers.

Reference to a processing system 130 is similarly inclusive of a universe of processing technologies including dedicated graphics cards that interface with a motherboard, integrated graphics processors (IGPs) and unified memory architectures. Reference to a graphics processing unit is also meant to be inclusive of that segment of graphics processing technologies that include hybrid graphics processing as well as general purpose graphics processing units (GPGPUs) running compute kernels and external GPUs (eGPUs) that are located outside the housing of a computing device.

The driver system 120 controls the individual transducers 160 of array 110 thereby creating a tactile sensation on the hand 150 of the user. Responsive to information received from processing system 130, driver 120 broadcasts a control signal to one or more of the transducers 160 in the array 110. Driver 120 may operate in conjunction with one or more slave circuits (not shown) that receive the broadcast signal from driver 120 to control a series of the aforementioned transducers. Driver 120 (and slaves) may include one or more field programmable gate arrays, amplifiers, and high pass filters as known in the ultrasonic art.

Driver 120 may utilize one or more algorithms stored in memory and executable by one or more processors to create steered beams at the array 110 to produce focal points of ultrasonic energy that provide sufficient radiation pressure to be felt by the skin of the user. The focal points of ultrasound energy are created through constructive interference amplified and steered through software driven transducer control by driver 120.

Driver 120 may model one or more points in three-dimensional space responsive to tracking information corresponding to a user hand 150 and received from tracking system 140 and subsequently processed by processing system 130. This modeling may first occur on a volumetric basis for an overall acoustic field (e.g., workspace 180) as might be created by transducer array 110. Modelled points may then be defined in that three-dimensional workspace 180 whereby those points are distributed amongst the array of transducers as a function of position, phase, and amplitude. Different points may be generated using different phase maps and corresponding intensities based on the nature of the haptic interaction with a given object and the positioning of the hand of a user relative to that particular object in space and time. An example of such a modeling technique is disclosed in Gavrilov's "The Possibility of Generating Focal Regions of Complex Configurations in Application to the Problems of Stimulation of Human Receptor Structures by Focused Ultrasound," *Acoust. Phys.* (2008) Vol. 54, Issue 2 at 269 et seq.

As a result of this modeling, tactile sensations on the skin of user hand 150 can be created by using a phased array of ultrasound transducers $160_a \ldots 160_n$ to exert acoustic radiation responsive to control instructions from driver 120. Ultrasound waves are transmitted by the transducers $160_a \ldots 160_n$ of array 110 with the phase emitted by each transducer 160 adjusted such that the waves concurrently arrive at the target point (i.e., the user hand 150) in order to maximize the acoustical radiation force exerted. Whereas many existing ultrasonic devices do not allow for distinctive multiple localized feedback points in mid-air, the present invention allows for high resolution haptic feedback through the use of a library of haptic features such that a user can distinguish between multiple localized feedback points separated by a small distance. Such a system also allows information to be transmitted via an additional haptic channel in parallel with or as an alternative to a visual display. This is in addition to the aforementioned benefits of increased interaction range, multiple sensation points or areas on user appendages, and increased comfort of the user.

Figure 1B:
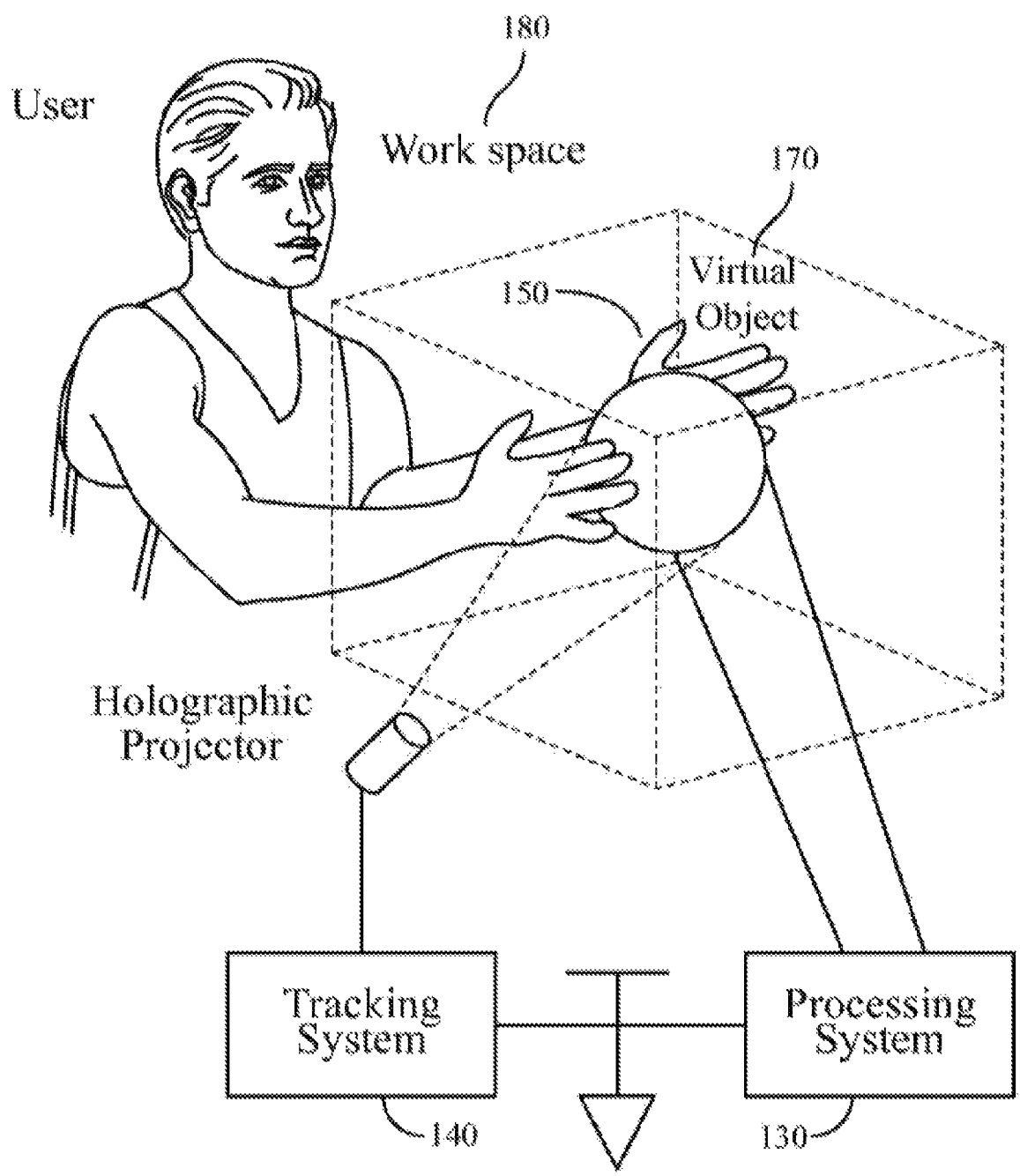
FIG. 1B illustrates a user interacting with a virtual object generated by an immersive computing system operating in conjunction with an ultrasound system like that in FIG. 1A.

FIG. 1B illustrates a user interacting with a virtual object generated by an immersive computing system operating in conjunction with an ultrasound system 100 like that in FIG. 1A. The user of FIG. 1B interacts with a virtual object 170 in an immersive computing workspace 180 subject to tracking by tracking system 140. As shown in FIG. 1B, the immersive computing environment is created through holographic projection. The specific dimensions of the workspace 180 may vary dependent upon a particular implementation of the ultrasound system 100 (specifically the ultrasonic power of array 110) and the immersive computing environment, including the size of virtual object 170.

In FIG. 1B, the hands 150 of user are tracked by tracking system 140 relative to the virtual reality object 170 generated by a computing device working in conjunction with or otherwise including processing system 130. As the hands 150 of user approach the virtual object 170—an approach observed by tracker 140 and communicated to processing system 130—the driver 120 can receive processed positional information from processing system 130 to cause the transducer array 110 to effectuate a particular tactile sensation at hands 150 based on their current position in three-dimensional space and relative to the virtual object 170. For example, virtual object 170 may be a basketball having a particular circumference requiring the ultimate sensation of coming into contact with the ball surface. Transducers $160_a \ldots 160_n$ of array 110 may be controlled by driver 120 responsive to processing system 130 to create the sensation of coming into contact with that object in real-world space.

Figure 2A:
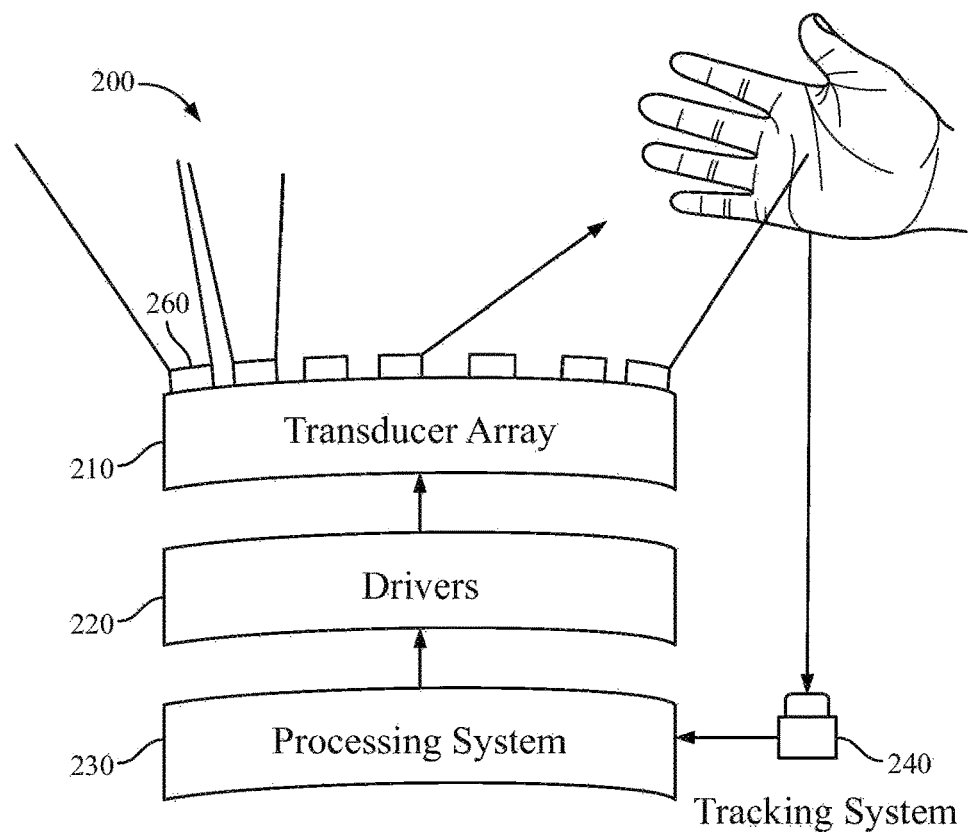
FIG. 2A illustrates a curved ultrasound system providing for tactile mid-air haptic feedback.

FIG. 2A illustrates a curved ultrasound system 200 providing for tactile mid-air haptic feedback. The ultrasound system 200 of FIG. 2A operates in a manner similar to the ultrasound system 100 of FIG. 1A but for the fact that the transducer array 210 has a convex curvature. Driver system 220 operates in a manner similar to that of driver system 120 in FIG. 1A but—at least as illustrated in FIG. 2A—is similarly curved in nature. A preferred embodiment of ultrasound system 200 presents with the dual convex configuration of array 210 and driver 220. An alternative embodiment is nevertheless possible with a curved transducer array 210 and a flat driver system like that shown in FIG. 1A (120) and as illustrated in FIG. 2B below.

In FIG. 2A, the design and implementation of processing system 230 and tracking system 240 are not changed versus corresponding elements 130 and 140 of FIG. 1A. Nor do transducers 260 . . . 260$_n$ change with respect to their underlying design and functionality as described in the context of FIG. 1A. Only the presentation of transducers 260 changes in light of the form factor of the convex array 210. Due to the curvature of the array 210, the positioning of the individual transducers 260 will be angled (curved) thereby resulting in a 'fan shape' and corresponding increase in the volume of the acoustic field versus that which may be produced by the typical two-dimensional flat panel array 110 of FIG. 1A. The foregoing notwithstanding, the work flow of the various elements of the ultrasound system 200 in FIG. 2A is otherwise identical to that of system 100 concerning tracking, driver control, and ultimate creation of a tactile sensation.

Figure 2B:
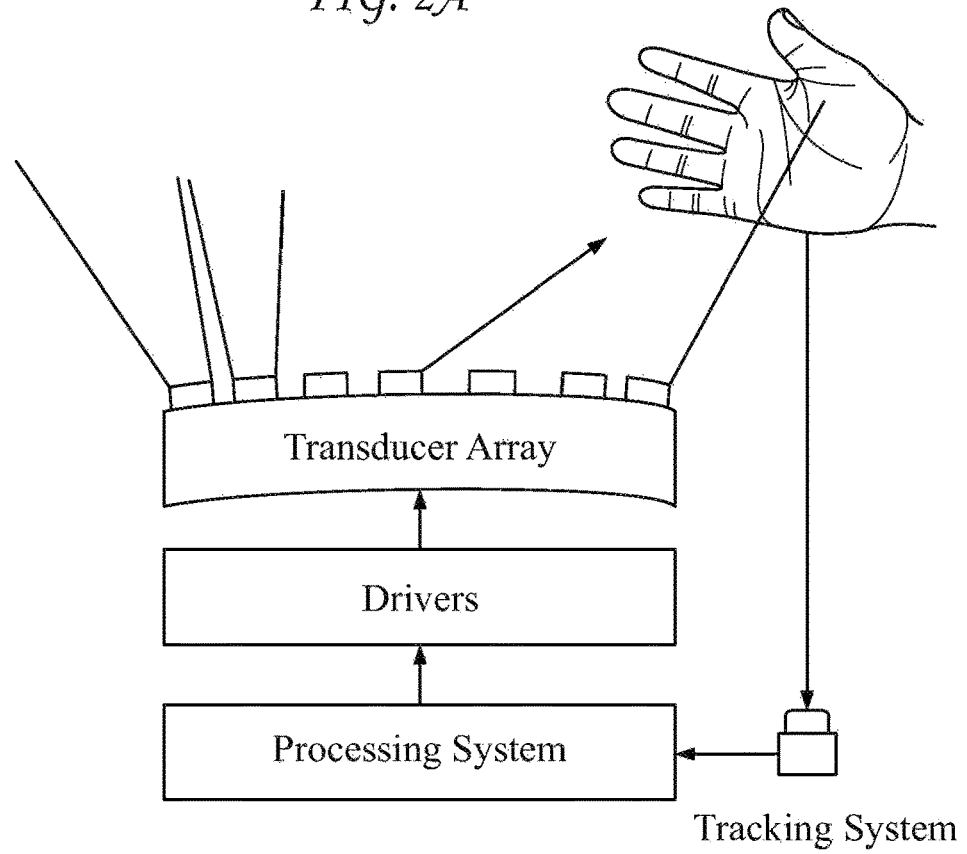
FIG. 2B illustrates an alternative embodiment of FIG. 2A where the processing system and driver are flat but the ultrasound system retains a curved form factor.

FIG. 2B illustrates an alternative embodiment of FIG. 2A where the processing system and driver are flat but the ultrasound system retains a curved form factor. The functionality of the elements of the alternative embodiment illustrated in FIG. 2B are the same as described in the context of FIG. 2A. The embodiment of FIG. 2B is meant to illustrate that different forms of componentry may be utilized in the course of implementing the presently claimed invention while retaining the underlying functionality of the same.

Figure 3A:
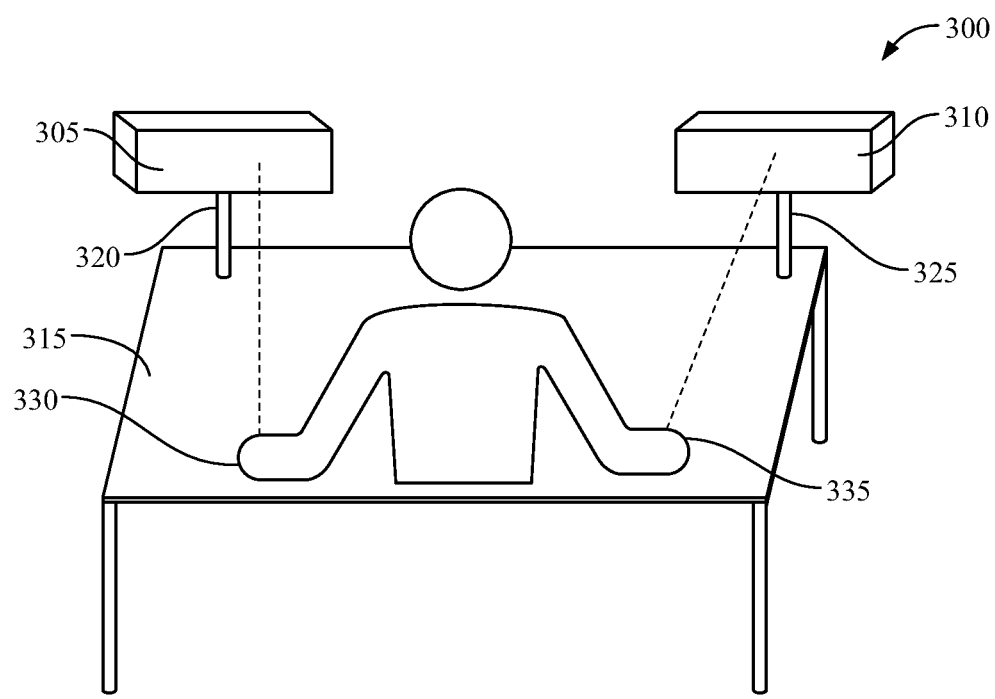
FIG. 3A illustrates a multi-array ultrasound system for providing tactile mid-air haptic feedback where the system is part of a workstation-based installation.

FIG. 3A illustrates a multi-array ultrasound system 300 for providing tactile mid-air haptic feedback where the system is part of a workstation-based installation. The ultrasound system 300 of FIG. 3A utilizes a two-dimensional flat-panel ultrasound system design like that described in the context of FIG. 1A (i.e., ultrasound system 100). The ultrasound system 300 is integrated into mountable ultrasound units 305 and 310. Mountable units 305 and 310 are then structurally coupled to the workstation 315 by way of adjustable stands 320 and 325.

The multiple arrays illustrated in the context of FIG. 3A (and other multi-array systems as discussed herein) may be synchronized utilizing a master processing system (not shown) and driver (illustrated earlier herein) for one of a series of ultrasound arrays with all other arrays operating in a slave relationship to the same (i.e., with a driver but no master processing system). In some embodiments, the master processing system and any requisite master-slave software componentry may be integrated into the processing system, the driver system, or a combination of the two. A specialized synchronization component need not be present and may be integrated into other elements of the system.

The master processing system (or processing system tasked as the master) may determine phase maps and intensity values for one or a series of arrays. The master processing system may then communicate with the slave units (or non-master processing systems) and maintain synchronicity with the same. The communicative coupling between the arrays may be wired or wireless. In the latter instance, the systems may use any number of communications protocols including but not limited to 802.xx, ultrasound, or Bluetooth, Stands 320 and 325 may be similar to speaker stands manufactured for the placement of satellite speakers in home sound systems. Stands 320 and 325 may be height adjustable with a heavy-gauge offset steel pillar having an integrated channel for the purpose of housing, protecting, and guiding various wire channels related to mountable units 305 and 310 (e.g., power couplings). Mountable ultrasound units 305 and 310 may be affixed to stands 320 and 325 through a top plate, L-shape, or keyhole-type bracket depending on the weight and other specifications of units 305 and 310. Stands 320 and 325 may be free-standing with respect to the workstation 315 or may be temporarily or permanently affixed to the same. Workstation 315 may be a working surface such as a desk or table. Workstation 315 is inclusive of any area (e.g., a workspace) where a user is engaged with some sort of output warranting tactile mid-air haptic feedback.

Ultrasound system 300 allows tactile sensation to be provided to both hands 330 and 335 of a user. Such a system may be paired with an immersive computing system offering, for example, VR, AR, or instances of holographic interaction (not shown). Such immersive computing systems may project an image or images in an open area of workstation 315 similar to the workspace 180 of FIG. 1B. In conjunction with a processing system and tracking system (as described elsewhere in this specification), input data related to the three-dimensional position of the hands of the user (330 and 335) are provided to a driver system, which controls the two-dimensional flat panel ultrasound componentry of mounted ultrasound units 305 and 310. Appropriate tactile sensations may be provided as dictated by any corresponding immersive computing generated visuals and user interaction with the same. While not illustrated in FIG. 3A, a further embodiment may include the likes of ultrasonic 'speaker' bar as described earlier in this disclosure. Such a speaker bar may be tasked with unique or specific ultrasonic related assignments much in the way a sub-woofer might operate in an audio system.

Figure 3B:
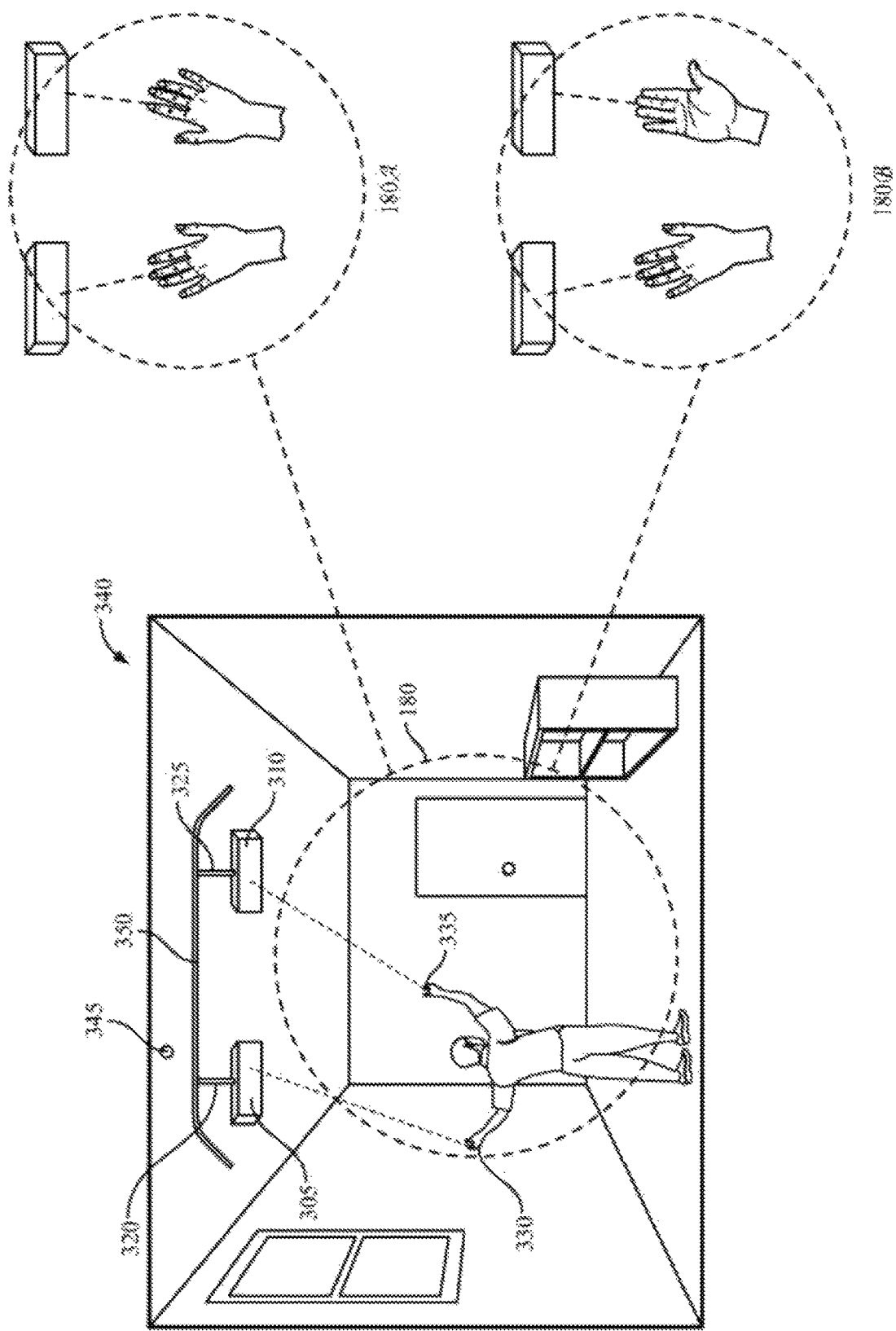
FIG. 3B illustrates a multi-array ultrasound system for providing tactile mid-air haptic feedback where the system is part of a ceiling-based installation.

FIG. 3B illustrates a multi-array ultrasound system 340 for providing tactile mid-air haptic feedback where the system is part of a ceiling-based installation 345. Like the ultrasound system 300 of FIG. 3A, system 340 includes flat-panel ultrasound systems integrated into mountable ultrasound units 305 and 310. Ultrasound units 305 and 310 of system 340 utilize a structural coupling mechanism, which may be similar to stands 320 and 325 of FIG. 3A.

Unlike FIG. 3A, the ultrasound units 305 and 310 shown in FIG. 3B cannot be free-standing due to the fact that said units are mounted to the ceiling 345. The ultrasound units 305 and 310 of FIG. 3B may be movable or adjustable, however, as can be effectuated through the use of a continuous track devices 350 that contain any necessary electrical conductors and that otherwise receive stands 320 and 325. Tracks 350 can be mounted to the ceiling 345 (or walls) lengthwise down beams or crosswise across rafters or joists allowing for X- and Y-axis adjustments. Ultrasound units 305 and 310 may alternatively or additionally be coupled to the ceiling 345 or track devices 350 with adjustable mounts allowing for height adjustment (Z-axis adjustments).

The workstation 315 of FIG. 3A is replaced by the broader workspace 180 concept of FIG. 1B. This configuration allows tactile sensation to be provided to both hands 330/

335 of the user in a room scale setting without the need of ultrasound devices being placed on a table or other fixture. As shown in the exploded views 180A-180B of FIG. 3B that highlight workspace 180, the user can interact with a larger distance and more readily extend their arms and hands in a natural manner. This is accomplished without necessarily sacrificing user comfort. Further—and as is also shown in said exploded view 180A or 180B—the user may encounter multiple sensations or interactions over a given appendage, parts of appendage, opposite sides or locales of an appendage, various appendages, or a combination of the foregoing. As a result, the user has a more comprehensive engagement with the workspace.

Ultrasound system 340 may be paired with an immersive computing system that projects or displays an image or images in the open workspace 180. In conjunction with a processing system and tracking system, appropriate tactile sensations may be provided as dictated by any immersive computing environment visuals and user interaction with the same by way of driver componentry interacting with the aforementioned processing system and ultrasound array of system 340.

Figure 3C:
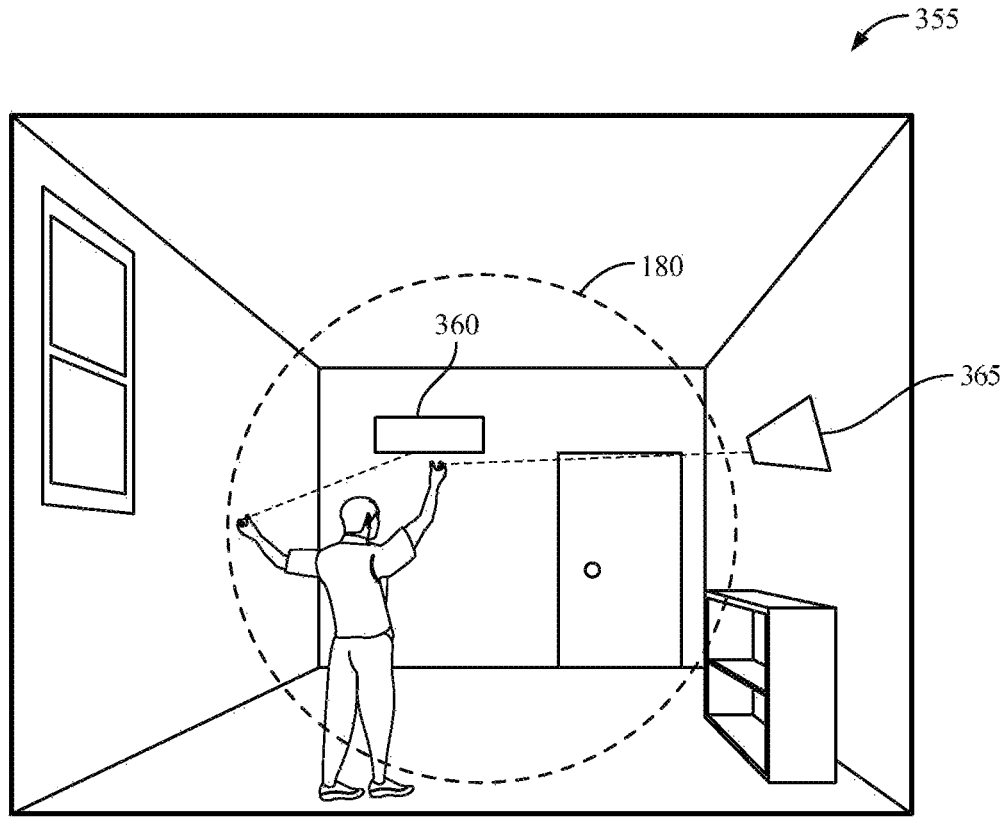
FIG. 3C illustrates a multi-array ultrasound system for providing tactile mid-air haptic feedback where the system is part of a wall-based installation.

FIG. 3C illustrates a multi-array ultrasound system 355 for providing tactile mid-air haptic feedback where the system is part of a wall-based installation 360. FIG. 3C illustrates an alternative implementation of a flat panel ultrasound system where ultrasound units are embedded in a wall or other surface area as shown by installations 360 and 365. Units may also be attached or otherwise installed subject to the physical design characteristics or limitations of any particular surface area. The design and operation of the ultrasound system 355 is otherwise like that of FIGS. 3A and 3B whereby tactile sensations may be provided as dictated by any corresponding immersive computing system visuals and corresponding user interaction within workspace 180.

Figure 4A:
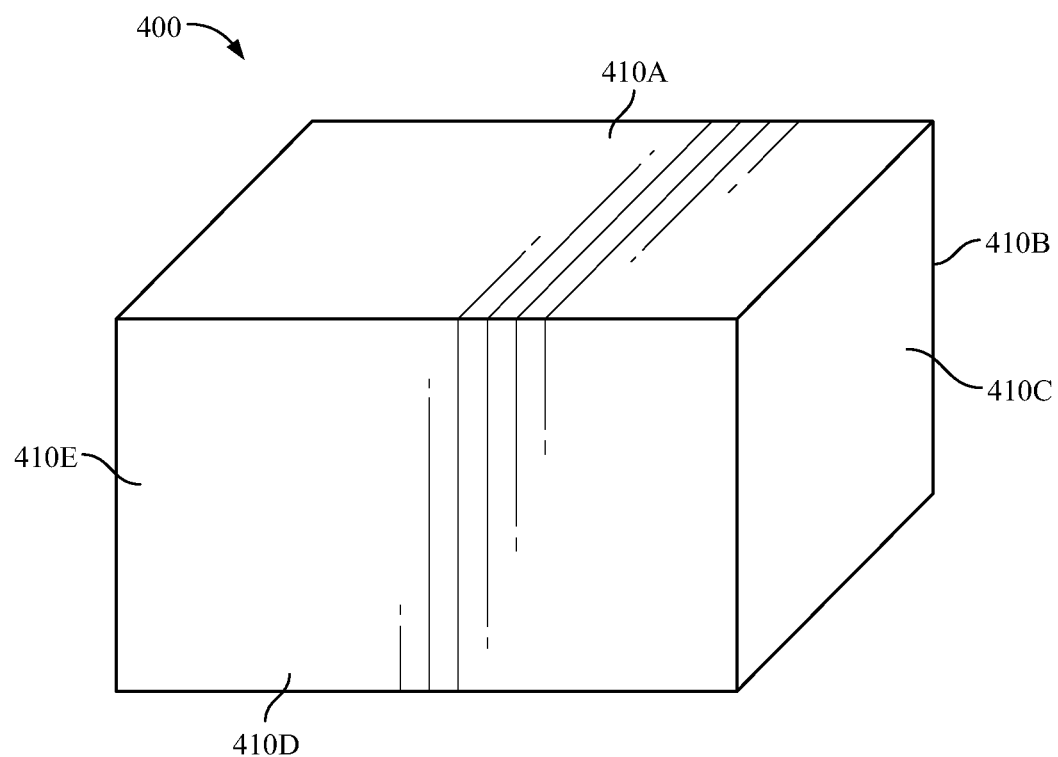
FIG. 4A illustrates a polyhedral ultrasound system for providing tactile mid-air haptic feedback where the system is a cube.

FIG. 4A illustrates a polyhedral ultrasound system 400 for providing tactile mid-air haptic feedback where the system is a cube. The form factor illustrated in FIG. 4A includes a flat panel ultrasound system like the two-dimensional ultrasound system 100 of FIG. 1A. By utilizing a polyhedral design, specifically a cube, a user may feel tactile sensation and interact with the system 400 from multiple angles. Such a system may similarly allow for omnidirectional tracking and interaction depending on the exact placement and integration of transducers and the range of a corresponding tracking system or systems.

In the embodiment of FIG. 4A, multiple tracking systems are integrated in the system 400 such that the hands of the user may be tracked on five sides $410_A$ ... $410_E$ (i.e., front, back, left, right, and top). Operational hardware for the tracking systems—in a preferred embodiment—is located within the polyhedral design of the cube (i.e., inside 'the box') to allow for wired buses and optimal bandwidth connections. Actual imaging devices may extend outward from the cube-design (i.e., break the plane of any side of the cube) or be placed amongst a variety of transducers such that the sides of the cube maintain an overall flat appearance. Other system hardware may likewise be included within the cube form-factor, including but not limited to drivers and processing system.

In an alternative embodiment, however, certain hardware may be located outside and physically distinct from the actual cube. That hardware may communicate with the system by way of a wired connection through the 'bottom' of the cube. Communications may also be facilitated through one or more wireless modes of communication such as Bluetooth or IEEE 802.x. Whether certain hardware is located internal to or outside the cube form may be a factor of the actual physical size constraints of the cube and bandwidth requirements for various graphic processing and ultrasound driving componentry.

Regardless of the actual locale of certain hardware, the system 400 as illustrated in FIG. 4A provides tactile sensation in combination with a variety of visuals as may be provided by an immersive computing system. That system may similarly be internal to or external to the cube form factor either in whole or in part. While described with respect to five sides, embodiments may utilize less than all five exposed surfaces. For example only the left and right sides or front and back sides may be used. Alternatively, an embodiment may make use of only the sides and top, front and back and top, or any combination of the foregoing. Such combinations allow for more natural 'hands facing in' interactions when system 400 is placed on a surface whereby the hands of a user are proximate the left and right side of the cube with the hands facing the cube.

The system 400 of FIG. 4A may also include a modular feature where ultrasound array panels may be removed and repositioned on the form factor of FIG. 4A or those similar in concept. For example, a front side ultrasound array may be removed and moved to a backside of the cube while a non-ultrasound panel that previously occupied the backside is moved to the front. Such a feature would allow for production and commercialization of a 'base' model with potential upgrades of additional panels, arrays, driver, and the like depending on demands or improvements in immersive computing and/or graphics processing technologies.

Figure 4B:
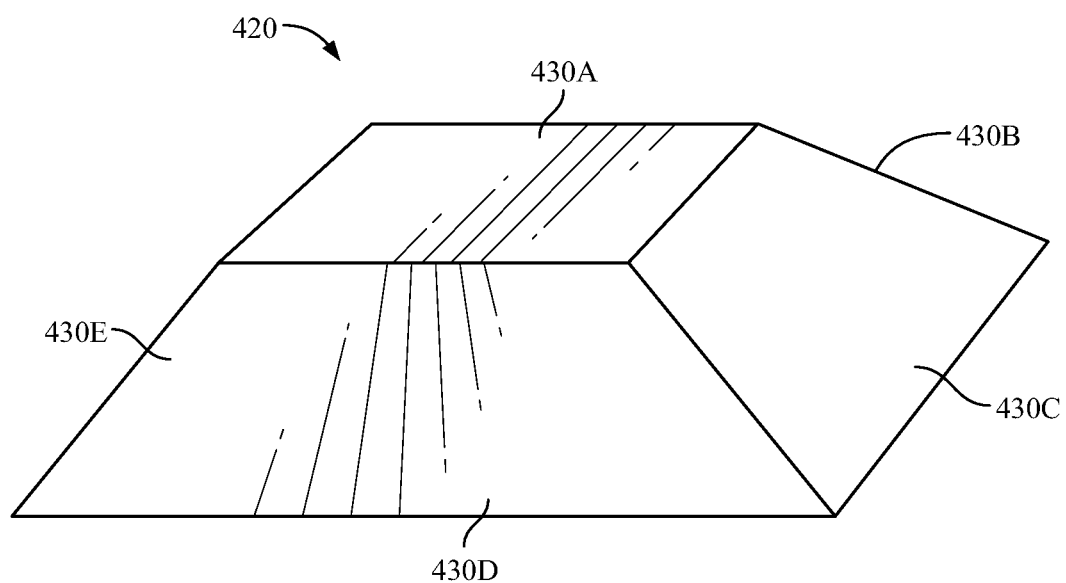
FIG. 4B illustrates a polyhedral ultrasound system for providing tactile mid-air haptic feedback where the system is a truncated pyramid.

FIG. 4B illustrates a polyhedral ultrasound system 420 for providing tactile mid-air haptic feedback where the system is a truncated pyramid. Like the cube embodiment of FIG. 4A, the embodiment shown in FIG. 4B includes five flat panel systems (like system 100 of FIG. 1A) but arranged in a truncated pyramidal configuration instead of that of a cube. Such a form factor allows the user to experience tactile sensations and interact with system 420 from multiple angles while simultaneously maintaining a low profile for ease of use. While illustrated here as a truncated pyramid, other designs may be used including an actual pyramid.

The embodiment of system 420 as shown in FIG. 4B, includes multiple integrated tracking systems. Integration of such trackers into the system 420 may be similar to those discussed in the context of the cube configuration of FIG. 4A, including but not limited to positioning of related hardware. Integration of tracking devices in such a manner allows hands of the user to be tracked on five sides $430_A$ ... $430_E$ (i.e., front, back, left, right, and top). The system 420 may then provide tactile sensation in combination with a variety of visuals as may be provided by an immersive computing system, which may be proximate or remote to the system 420 in a manner like that addressed with respect to FIG. 4A. Also similar to FIG. 4A is the fact that embodiments may utilize less than all five exposed surfaces, for example only the sides, only the front and back, sides and top, front and back and top, or any combination of the foregoing. Modular configurations are also envisioned in the context of the form factor of FIG. 4B.

Figure 5A:
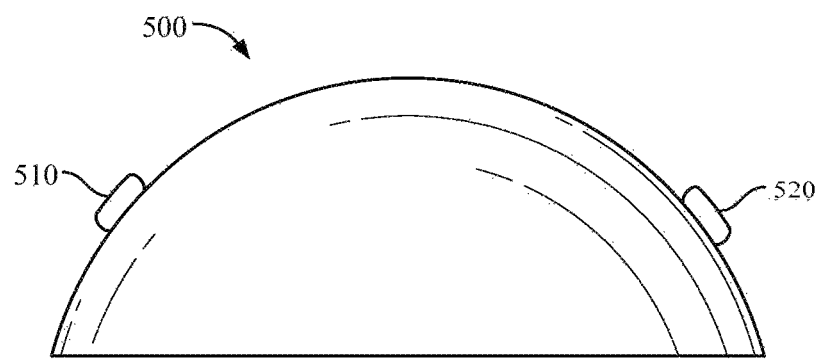
FIG. 5A illustrates an ultrasound system for providing tactile mid-air haptic feedback that is at least partially spherical.

FIG. 5A illustrates an ultrasound system 500 for providing tactile mid-air haptic feedback that is at least partially spherical such as a semi-sphere. An ultrasound system 500 like that of FIG. 5A utilizes a curved ultrasound array like the system 200 of FIG. 2A. The spherical or 'dome' design of FIG. 5A allows the user to feel tactile sensation and interact with the system 500 from multiple angles with more fluid interactive ability than that offered by a polyhedral design such as those illustrated in FIGS. 4A and 4B.

The ultrasound system 500 as illustrated in FIG. 5A utilizes two hand tracking devices 510 and 520. While two such devices are illustrated, it is possible for such an embodiment to configured with but one or a series of such hand tracking devices. While FIG. 5A illustrates tracking devices 510 and 520 as being integrated into the ultrasound system 500, an alternative embodiment may involve the placement of the tracking devices proximate the system. For example, tracking devices 510 and 520 may be located on a table or workstation that hosts the ultrasound system 500. Tracking devices 510 and 520 could alternatively be located in a wall installation proximate the system 500 or located above the system 500 in a ceiling installation. As noted previously, additional tracking devices may also be implemented beyond the two illustrated in FIG. 5A. Other system hardware may be located internal or external the system 500 as was discussed in the context of the embodiments of FIGS. 4A and 4B.

Figure 5B:
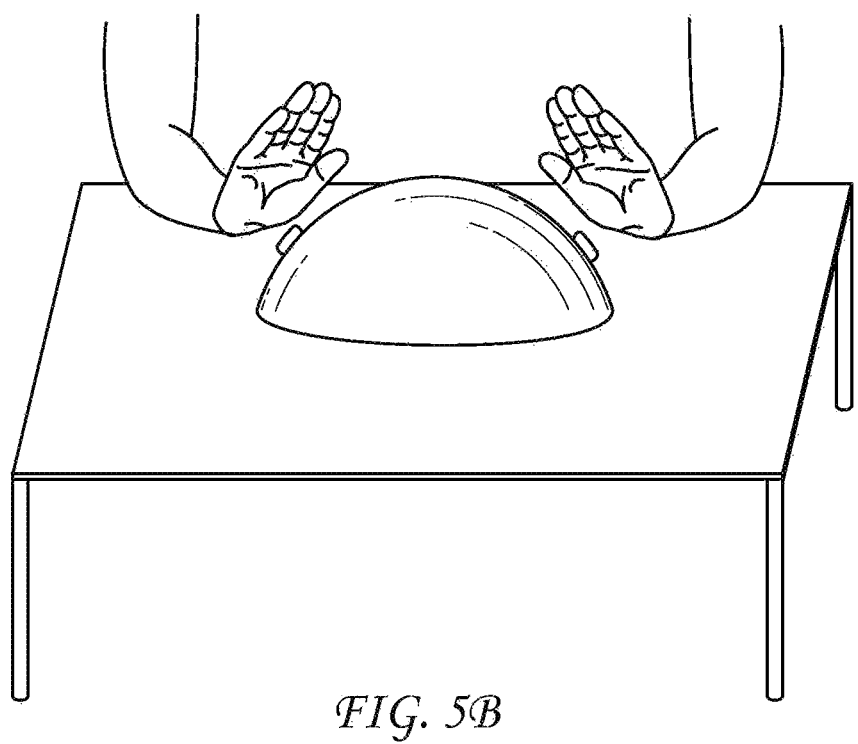
FIG. 5B illustrates the exemplary ultrasound system of FIG. 5A in use whereby it provides for a larger realm of interaction without sacrificing comfort or engagement of the user.

FIG. 5B illustrates the exemplary ultrasound system of FIG. 5A in use whereby it provides for a larger realm of interaction without sacrificing comfort or engagement of the user. As can be seen in FIG. 5B, the user is able to engage with larger distance and have a broader range of interactions with the workspace generated by the ultrasonic system, which otherwise has the same functionality as described in the context of FIG. 5A. The user is similarly able to encounter ultrasonic engagement at multiple points on a pair of appendages (i.e., the hands of the user). Such interactions are intuitively natural and comfortable as well as a result of the user resting their hands on a workstation that otherwise hosts the ultrasonic system. While a spherical embodiment like that of FIG. 5A is illustrated, the benefits of such a system may be enjoyed in any number of form factors—spherical or otherwise, including but not limited to cylindrical.

Figure 5C:
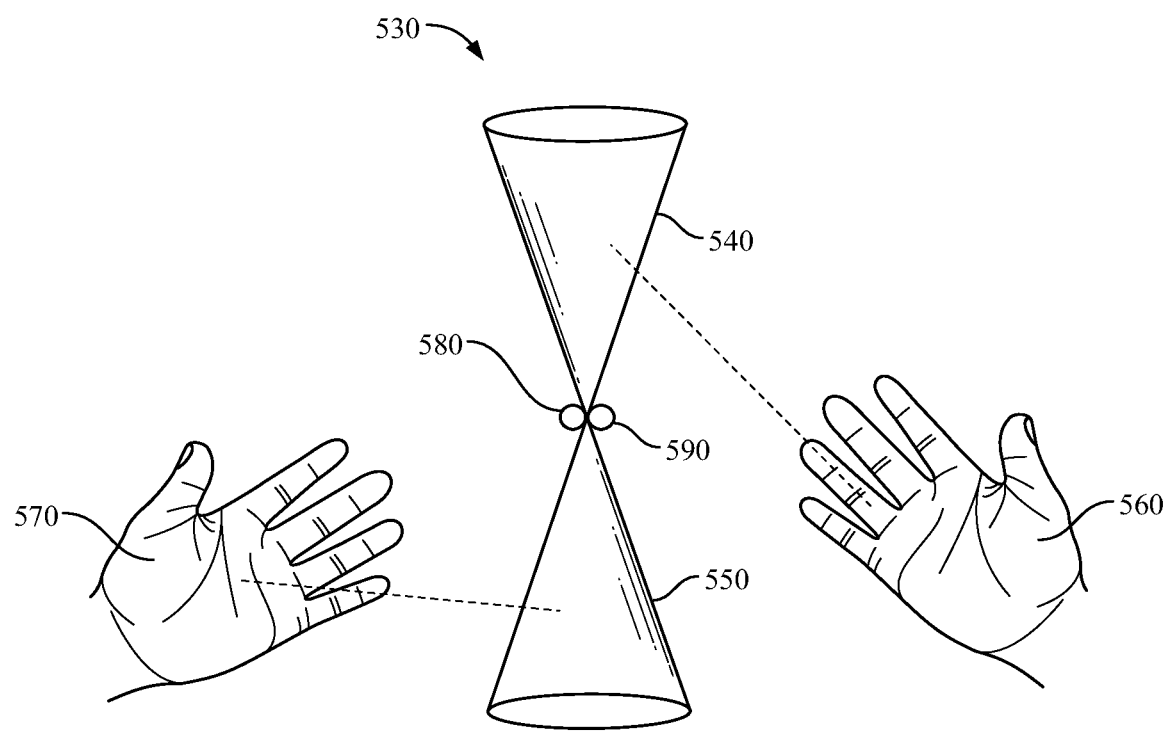
FIG. 5C illustrates an ultrasound system for providing tactile mid-air haptic feedback that is at least that is at least partially conical.

FIG. 5C illustrates an ultrasound system 530 for providing tactile mid-air haptic feedback that is at least that is at least partially conical. The embodiment of FIG. 5C includes two curved panel systems 540 and 550 (like that of FIG. 2A) and arranged in an hour-glass form factor. Such a form-factor allows a user to feel tactile sensations from both palms in a face-up (560) as well as a face-down (570) placement.

The ultrasound system 530 as illustrated in FIG. 5C includes two hand tracking devices 580 and 590 integrated into the ultrasound system 530. While illustrated with two such devices, as noted elsewhere in this disclosure, embodiments may include but a single hand tracking device or a series of the same. An alternative embodiment may involve placement of the tracking devices proximate the system 530. For example, tracking devices 580 and 590 may be located on a table or workstation that hosts the ultrasound system 530. Tracking devices 580 and 590 could alternatively be located in a wall installation proximate the system 530 or located above the system 530 in a ceiling installation. Additional tracking devices, as noted earlier, may also be implemented beyond the two illustrated in FIG. 5C. Other system hardware may be located internal or external to the system 530 as was discussed in the context of the embodiments of FIGS. 4A and 4B.

Figure 6A:
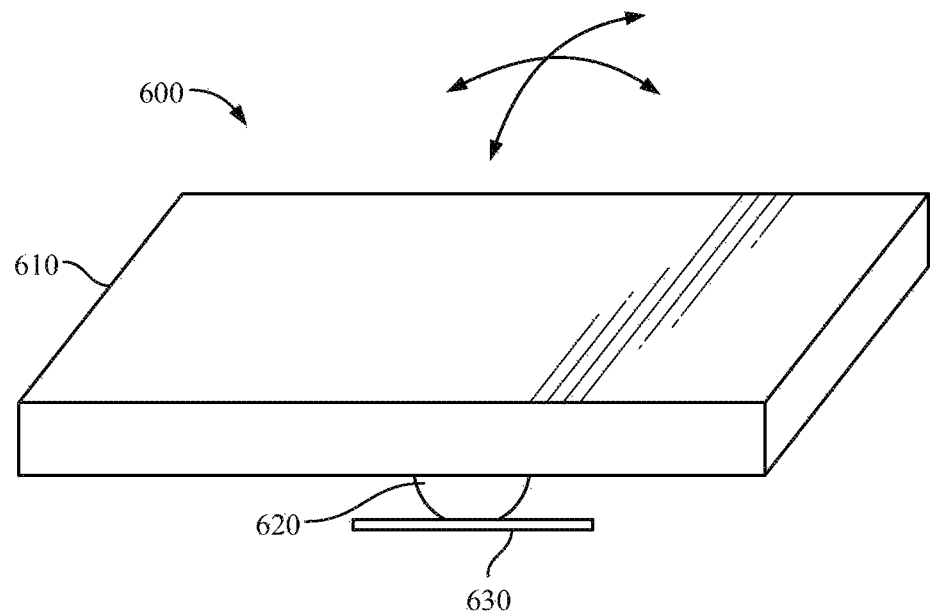
FIG. 6A illustrates a movable ultrasound apparatus for providing tactile mid-air haptic feedback including a flat panel ultrasound system coupled to a gimbal array.

FIG. 6A illustrates a movable ultrasound apparatus 600 for providing tactile mid-air haptic feedback including a flat panel ultrasound system coupled to a gimbal array. Flat-panel ultrasound system 610 is like that described with respect to FIG. 1 (ultrasound system 100). Apparatus 600 of FIG. 6A further includes a motorized gimbal system 620 and base 630 that allows for multi-axis movement. Such multi-axis movement allows for a wider range of interaction while maintain ultrasonic panels more parallel to the hands of a user notwithstanding the natural angulation and movement of the hands of a user.

In an exemplary embodiment of gimbal system 620, a set of three gimbals are presented—one mounted on the other with orthogonal pivot axes. Such a design allows system 610 to enjoy roll, pitch, and yaw control. The base 630 and mechanical componentry embodied therein controls the gimbal system 620 such that a user might enjoy six-degrees of freedom and vector control over the corresponding ultrasound panel 610 and the transducers therein. Gimbal system 620 may be integrated into an immersive computing system to further facilitate a virtual or augmented reality experience.

In some embodiments, the gimbal system 620 may allow for inertial dampening if the ultrasound apparatus 600 is being utilized in a physically unstable environment. For example, ultrasound apparatus 600 may be a part of a larger virtual or augmented reality environment. Such an environment may utilize rumbles or vibrations independent of engagement with a haptic interface (e.g., to simulate an earthquake or explosion). Inertial dampening through use of a gimbal system would allow for such effects to be provided without interfering with the haptic experience offered by system 600.

An apparatus like that of FIG. 6A also allows for increased engagement with a more limited surface area or array of transducers. Like the other form factors discussed throughout, such a system also allows for a wider realm of engagement, more points of interaction and sensation, and increased user comfort. An ultrasonic system like that of FIG. 6A, in particular, may allow for a determination of an optimal angle for providing an increased or optimized ultrasonic sensation or series of sensations. By integrating such functionality into a moveable array, as the user or an appendage of the user moves, the array may also move such that the sensation remains constant through the engagement notwithstanding a change of position of the appendage in three-dimensional space.

Through the use of gimbal system 620, the apparatus 600 allows for increased tactile interaction with the hands of a user by moving relative to a user or a virtual object or a combination of the two. A hand tracking device like that of FIG. 1A (not shown) captures the hand position of a user and, in addition to providing driver instructions by way of a processing system, also influences control of the gimbal hardware such that it adjusts the angle of the ultrasound panel to remain perpendicular to the hands of the user.

Figure 6B:
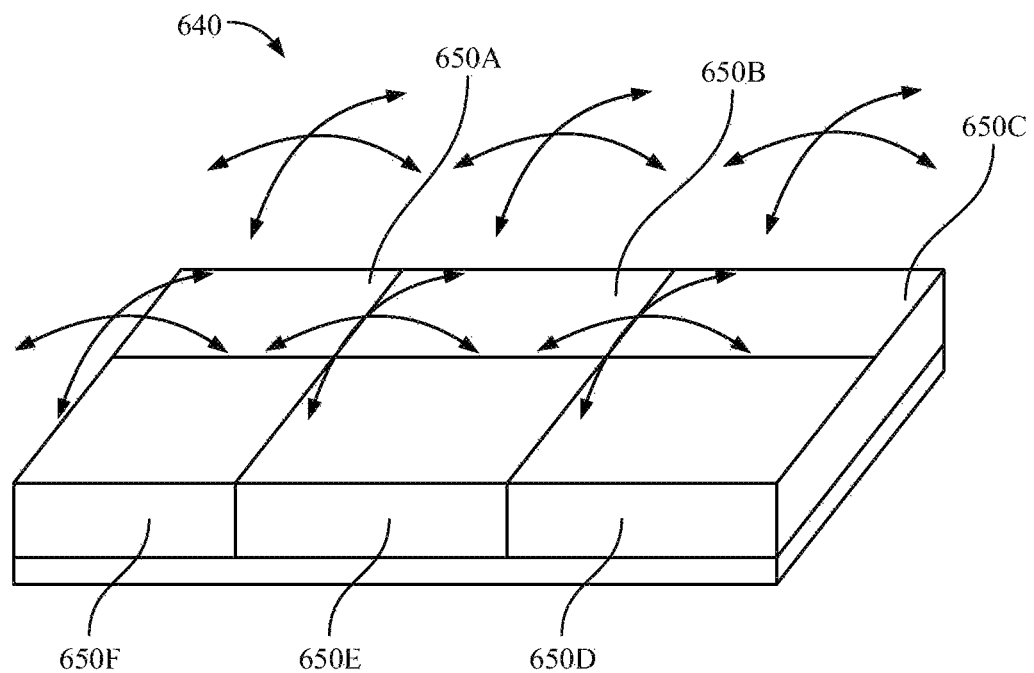
FIG. 6B illustrates a movable ultrasound apparatus for providing tactile mid-air haptic feedback, which may include moveable sub-arrays as well as individually moveable transducers coupled to a gimbal system and otherwise making up a flat panel ultrasound array.

FIG. 6B illustrates a movable ultrasound apparatus 640 for providing tactile mid-air haptic feedback, which may include moveable sub-arrays as well as individually moveable transducers $650_A \ldots 650_N$ coupled to a gimbal system and otherwise making up a flat panel ultrasound array. In an embodiment using individually moveable transducer arrays or sub-arrays as addressed herein, various synchronization techniques may be used including but not limited to those discussed earlier in the context of a multi-array ultrasound system. The ultrasound array 650 of FIG. 6B is otherwise collectively comparable to the flat-panel array of FIG. 1A, but includes a series of individually moveable transducers $650_A \ldots 650_N$ versus said transducers being fixed in the context of FIG. 1A. Each of the individually moveable transducers $650_A \ldots 650_N$ is coupled to a gimbal system and base. This coupling allows for multi-axis movement by an individually paired gimbal and base operating in conjunction with each transducer 650.

Alternatively, a series of transducers may make up an individual panel of transducers (a sub-array) with a particular ultrasound array having a series of transducer panels. Instead of the array or individual transducers having a gimbal mechanism, the aforementioned panels of transducers may have a gimbal and base pairing. In both of these embodiments, specifically directed tactile feedback is possible such that tactile sensations are directed at various portions of the user body or specific areas thereof. Multiple tracking systems may be implemented in such an embodiment, including per panel or per transducer.

Figure 7:
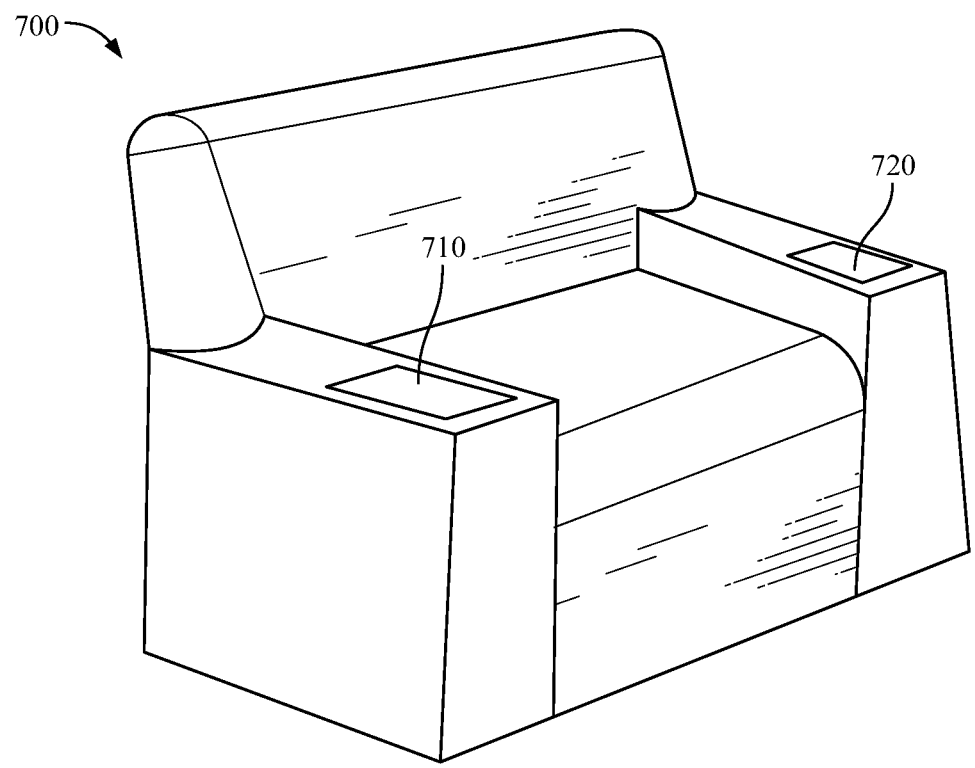
FIG. 7 illustrates a form factor whereby a flat panel ultrasound system for providing tactile mid-air haptic feedback is integrated into a chair.

FIG. 7 illustrates a form factor 700 whereby a flat panel ultrasound system for providing tactile mid-air haptic feedback is integrated into a chair. The embodiment of FIG. 7 involves a flat panel two-dimensional ultrasound system 100 like that disclosed in the context of FIG. 1A. Specifically, the chair embodiment 700 of FIG. 7 involves two such two-dimensional ultrasound panels—one installed in each arm of the chair—elements 710 and 720, respectively. An embodiment utilizing such a form factor allows for interactions and tactile sensation from a seated position. The positioning of ultrasound panels 710 and 720 at the ends of the arm rests allow the arms of a user to be at rest while the hands of the user are still engaged with content generated by an immersive computing system. Synchronization techniques like those described above may be implemented to the extent such a synchronized experience is required in light of a part use claim or content engagement.

Figure 8:
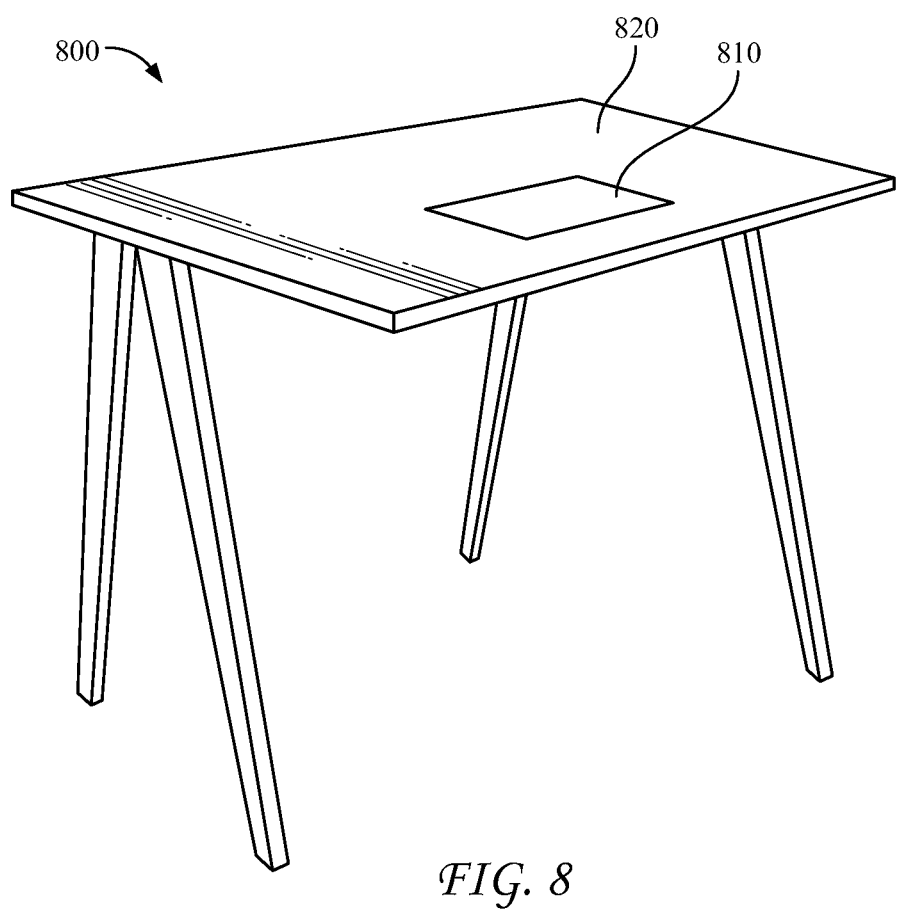
FIG. 8 illustrates a form factor whereby a flat panel ultrasound system for providing tactile mid-air haptic feedback is integrated into a table.

FIG. 8 illustrates a form factor 800 whereby a flat panel ultrasound system for providing tactile mid-air haptic feedback is integrated into a table. The embodiment of FIG. 8 involves a flat panel two-dimensional ultrasound system 100 like that disclosed in the context of FIG. 1A. Specifically, the table embodiment 800 of FIG. 8 involves a single panel 810 although a multitude of panels may be integrated directly into table 820 allowing for interaction with content generated by an immersive computing system. For example, different panels may be associated with different generated objects or environments. An embodiment such as this allows for interaction and tactile sensation coupled with the productivity and working space of a desktop environment.

Figure 9:
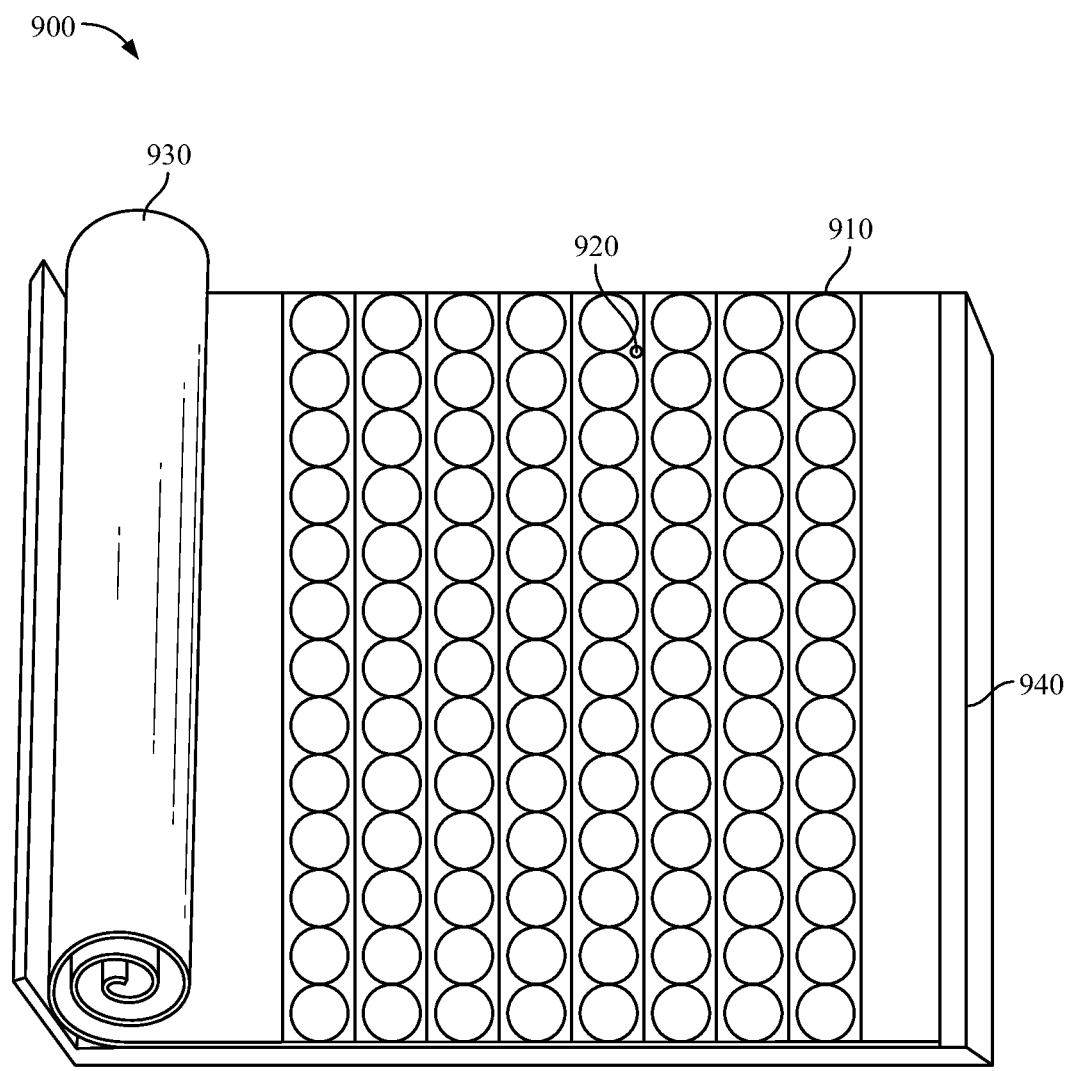
FIG. 9 illustrates a flexible ultrasound system for providing tactile mid-air haptic feedback.

FIG. 9 illustrates a flexible ultrasound system 900 for providing tactile mid-air haptic feedback. The ultrasound system 900 of FIG. 9 uses a segmented approach of the two-dimensional flat panel ultrasound system 100 as described in the context of FIG. 1A. The panels of ultrasound system 900 include of rows of transducers 910 with flexible material 920 interspersed there between. Integration of this material 920 between the rows of transducers 910 allows the system 900 to be rolled up as suggested by element 930. The end of the flexible system 900 includes a magnetic or some other adhesive strip 940 that maintains the system 900 in a closed position when in a rolled configuration.

The drivers (not shown) for each of the various transducers 910 may be manufactured from flexible electronics or flex circuits. The requisite driver circuitry may be mounted on a flexible plastic substrate such as polymide or transparent conductive polyester. Flex circuits may likewise be screen printed. Other means of producing a flexible driver component include the use of flexible silicon.

For example, instead of the transducers being interconnected by way of flexible material, some embodiments of the present invention may find the transducers directly integrated into a particular flexible material such as those that might be found in a flexible printed circuit board. Such a design may enjoy the benefits of lower manufacturing cost, reduced procurement times, and increased performance by 'tuning' the acoustic properties of a flexible matrix material thereby allowing for optimized ultrasonic operation.

It is also possible to create a flexible ultrasound sheet through micro-machining a piezoelectric ultrasound transducer in a polyimide substrate. The transducer is made on the substrate and package with polydimethylsilozane. Instead of etching the PZT ceramic, diced PZT blocks are placed into holes on the polyimide, which is pre-etched.

Various hardware elements may be further integrated or 'plugged into' the flexible ultrasound system 900 of FIG. 9 including but not limited hand tracking devices, processing systems, and the aforementioned transducer drivers. Those connections may be wired or wireless in design. The ultrasound system 900 itself may then be integrated into an immersive computing system.

The foregoing description has been presented for purposes of illustration. Said description is not intended to be exhaustive nor is it to limit the invention to the precise forms disclosed. Modifications are possible and inherent in light of the above teachings. The described embodiments were chosen in order to explain the principles of the invention, its practical application, and to allow others possessing ordinary skill in the art to implement those modifications and variations inherent thereto. It is intended that the ultimate scope of any particular embodiment be defined and/or limited exclusively by the claims that follow.

What is claimed is:

1. An ultrasonic system for haptic engagement in an immersive computing workspace, the system comprising:
   a processing system comprising one or more processors coupled to a memory, the memory storing instructions that, when executed by the one or more processors, cause the one or more processors to compute interaction of a user with one or more virtual objects in a three-dimensional space corresponding to the immersive computing workspace;
   a tracking device communicatively coupled to the processing system, wherein the tracking device is configured to track a hand of the user interacting with the one or more virtual objects in the three-dimensional immersive computing workspace and provide tracking information to the processing system;
   a flat-panel two-dimensional ultrasound transducer phased array including a plurality of ultrasonic emitters configured to produce one or more localized focal points of ultrasonic energy through beamforming and constructive interference capable of individual perception by the user, wherein at least one of the one or more localized focal points is produced based on activation of at least two of the plurality of ultrasonic emitters;
   a driver system independent from and communicatively coupled to the processing system and the ultrasound transducer array,
      wherein the driver system comprises a memory of the driver system coupled to one or more processors of the driver system,
      wherein the memory of the driver system is configured to store instructions that, when executed by the one or more processors of the driver system, cause the one or more processors of the driver system to broadcast a control signal and cause the plurality of ultrasonic emitters to create ultrasound beams to produce the one or more localized focal points of ultrasonic energy at the hand of the user, and wherein the one or more localized focal points are configured to create a mid-air tactile sensation at the appendage of the user, and a motorized gimbal assembly mounted to the flat-panel two-dimensional ultrasound transducer phased array and in communication with the processing system, wherein the motorized gimbal assembly enables multi-axis movement of the flat-panel two-dimensional ultrasound phased array, and is operated to maintain a parallel orientation of the flat-panel two-dimensional ultrasound transducer phased array relative to a palm of the hand of the user based at least on the tracking information.

2. The system of claim 1, wherein the immersive computing workspace comprises one or more of a virtual reality, simulated imagery, a mixed reality, an extended reality, an augmented reality, and a holographic projection.

3. The system of claim 1, wherein the flat-panel two-dimensional ultrasound transducer array is divided into two or more physically separate arrays of ultrasonic emitters.

4. The system of claim 3, wherein the two or more physically separate arrays are mounted to one or more of a workstation, a ceiling, or a plurality of walls.

5. The system of claim 4, further comprising a mounting, wherein the mounting is adjustable.

6. The system of claim 3, wherein the two or more physically separate arrays are embedded in a chair.

7. The system of claim 1, wherein the flat-panel two-dimensional ultrasound transducer array is embedded in a workstation.

8. The system of claim 1, wherein the flat-panel two-dimensional ultrasound transducer array is divided into a series of physically separate arrays incorporated in a polyhedral form factor.

9. The system of claim 8, wherein the polyhedral form factor is a cube.

10. The system of claim 9, wherein the series of physically separate arrays are disposed on up to six sides of the cube.

11. The system of claim 8, wherein the polyhedral form factor is a pyramid.

12. The system of claim 11, wherein the pyramid is truncated.

13. The system of claim 12, wherein the series of physically separate arrays are disposed on all but one side of the truncated pyramid.

14. The system of claim 9, wherein the tracking device is integrated into a surface of the cube.

15. The system of claim 11, wherein the tracking device is integrated into a surface of the pyramid.

16. The system of claim 1, wherein the flat-panel two-dimensional ultrasound transducer array is divided into a series of physically separate arrays of ultrasonic emitters.

17. The system of claim 16, where the series of physically separate arrays of ultrasonic emitters are disposed on the gimbal assembly.

18. The system of claim 1, wherein the driver system is further configured to broadcast the control signal to one or more slave circuits coupled to the plurality of ultrasonic emitters.

19. The system of claim 1, wherein the driver system comprises one or more processors coupled to a memory of the driver system, wherein the memory of the driver system stores one or more algorithms that, when executed by the one or more processors, cause the driver system to model one or more points in the three-dimensional immersive computing workspace in response to the tracking information.

20. The system of claim 1, wherein the instructions prescribe a set of phase values, each of the set of phase values associated with a signal emitted at an emitter of the plurality of ultrasonic emitters, wherein the set of phase values is determined, at least in part, based on the tracking information.

21. The system of claim 20, wherein the ultrasound beams are steerable, wherein steering the ultrasound beams comprises adjusting one or more of the set of phase values.

22. The system of claim 1, wherein the motorized gimbal assembly is further configured to provide inertial dampening in an event that the flat-panel two-dimensional ultrasound transducer phased array is operated in a physically unstable environment.

23. An ultrasonic system for haptic engagement in an immersive computing workspace, the system comprising:

a processing system comprising one or more processors coupled to a memory, the memory storing instructions that, when executed by the one or more processors, cause the one or more processors to compute interaction of a user with one or more virtual objects in a three-dimensional space corresponding to the immersive computing workspace;

a tracking device communicatively coupled to the processing system, wherein the tracking system is configured to track a hand of the user interacting with the one or more virtual objects in the three-dimensional immersive computing workspace and provide tracking information to the processing system;

a curved-panel ultrasound transducer phased array including a plurality of ultrasonic emitters arranged on a set of conical surfaces arranged in an hour-glass form factor, the plurality of ultrasound emitters configured to produce one or more localized focal points of ultrasonic energy through beamforming and constructive interference, wherein the one or more localized focal points of ultrasonic energy are capable of individual perception by the user, wherein at least one of the one or more localized focal points is produced based on an activation of at least two of the plurality of ultrasonic emitters; and a driver system independent from and communicatively coupled to the processing system and the ultrasound transducer array, wherein the driver system comprises a memory of the driver system coupled to one or more processors of the driver system, wherein the memory of the driver system is configured to store instructions that, when executed by the one or more processors of the driver system, cause the one or more processors of the driver system to broadcast a control signal and cause the plurality of ultrasonic emitters to create ultrasound beams to produce the one or more localized focal points of ultrasonic energy at the hand of the user, and wherein the one or more localized focal points are configured to create a mid-air tactile sensation at the hand of the user, and wherein the hour-glass form factor enables the mid-air tactile sensation to be provided at a palm of the hand regardless of an orientation of the hand.

24. The system of claim 23, wherein the tracking device is integrated into a surface of the curved-panel ultrasound transducer array.

25. The system of claim 23, wherein the hour-glass form factor further enables the mid-air tactile sensation to be provided at the palm and at an opposing surface of the hand simultaneously.

26. An ultrasonic system for haptic engagement in an immersive computing workspace, the system comprising:
- a processing system comprising one or more processors coupled to a memory, the memory storing instructions that, when executed by the one or more processors, cause the one or more processors to compute interaction of a user with one or more virtual objects in a three-dimensional space corresponding to the immersive computing workspace;
- a tracking device communicatively coupled to the processing system, wherein the tracking device is configured to track an appendage of the user interacting with the one or more virtual objects in the three-dimensional immersive computing workspace and provide tracking information to the processing system;
- a flexible-panel ultrasound transducer phased array configured to be arranged in a rolled-up configuration and including a plurality of ultrasonic emitters configured to produce one or more localized focal points of ultrasonic energy through beamforming and constructive interference, wherein the one or more localized focal points of ultrasonic energy are capable of individual perception by the user, and wherein at least one of the one or more localized focal points is produced based on activation of at least two of the plurality of ultrasonic emitters, and wherein the flexible-panel ultrasound transducer comprises a flexible material having material properties tuned to optimize an output of the plurality of ultrasonic emitters, and wherein the plurality of ultrasonic emitters is integrated into the flexible material; and
- a driver system independent from and communicatively and wirelessly coupled to the processing system and physically coupled to the ultrasound transducer array by way of a flexible substrate,
  - wherein the driver system comprises a memory of the driver system coupled to one or more processors of the driver system,
  - wherein the memory of the driver system is configured to store instructions that, when executed by the one or more processors of the driver system, cause the one or more processors of the driver system to broadcast a control signal and cause the plurality of ultrasonic emitters to create ultrasound beams to produce the one or more localized focal points of ultrasonic energy at the appendage of the user, and
  - wherein the one or more localized focal points are configured to create a mid-air tactile sensation at the appendage of the user.

27. The system of claim 26, wherein the flexible substrate includes polymide.

28. The system of claim 26, wherein the driver system is communicatively and wirelessly coupled to the processing system through a 802.xx or Bluetooth connection.

* * * * *